(12) United States Patent (10) Patent No.: US 8,510,799 B2
Fujii (45) Date of Patent: Aug. 13, 2013

(54) COMMUNICATION SYSTEM, COMMUNICATION SYSTEM MANAGEMENT APPARATUS, TERMINAL CONNECTION CONTROL METHOD, AND PROGRAM

(75) Inventor: Yoshihiro Fujii, Kanagawa (JP)

(73) Assignee: Sony Corporation, Tokyo (JP)

( * ) Notice: Subject to any disclaimer, the term of this patent is extended or adjusted under 35 U.S.C. 154(b) by 1087 days.

(21) Appl. No.: 12/037,788

(22) Filed: Feb. 26, 2008

(65) Prior Publication Data

US 2008/0229405 A1    Sep. 18, 2008

(30) Foreign Application Priority Data

Mar. 16, 2007    (JP) ................ P2007-069168

(51) Int. Cl.
*G06F 7/04* (2006.01)
*G06F 15/16* (2006.01)

(52) U.S. Cl.
USPC ............................................. 726/3; 709/225

(58) Field of Classification Search
USPC ....................................... 726/3, 15
See application file for complete search history.

(56) References Cited

U.S. PATENT DOCUMENTS

| | | | | |
|---|---|---|---|---|
| 6,559,863 B1* | 5/2003 | Megiddo | ....................... | 715/753 |
| 6,690,672 B1* | 2/2004 | Klein | ........................... | 370/401 |
| 2006/0064461 A1* | 3/2006 | Ludwig et al. | ................ | 709/204 |
| 2006/0190992 A1* | 8/2006 | Li et al. | ............................. | 726/3 |
| 2008/0235071 A1* | 9/2008 | Gutta et al. | ....................... | 705/9 |
| 2009/0007236 A1* | 1/2009 | Aoki et al. | ......................... | 726/3 |

FOREIGN PATENT DOCUMENTS

| | | |
|---|---|---|
| JP | 2003-229882 | 8/2003 |
| JP | 2005-328484 | 11/2005 |

* cited by examiner

*Primary Examiner* — Nathan Flynn
*Assistant Examiner* — Abdullah Almamun
(74) *Attorney, Agent, or Firm* — Finnegan, Henderson, Farabow, Garrett & Dunner, L.L.P.

(57) ABSTRACT

A communication system including many communication terminals and a management apparatus, which includes: a section which processes user authentication, a first information management section for managing authenticated user information in association with terminal information about the communication terminal used by the user, a second information management section for managing communication information including the user information about many users with intent to communicate with one another, and a connection control section. If the second information management section manages the communication information including the authenticated user information and if the first information management section manages the another user information as part of the communication information, the connection control section sends the terminal information about another communication terminal corresponding to the other user information, to the communication terminal identified by the terminal information in association with the authenticated user information.

15 Claims, 23 Drawing Sheets

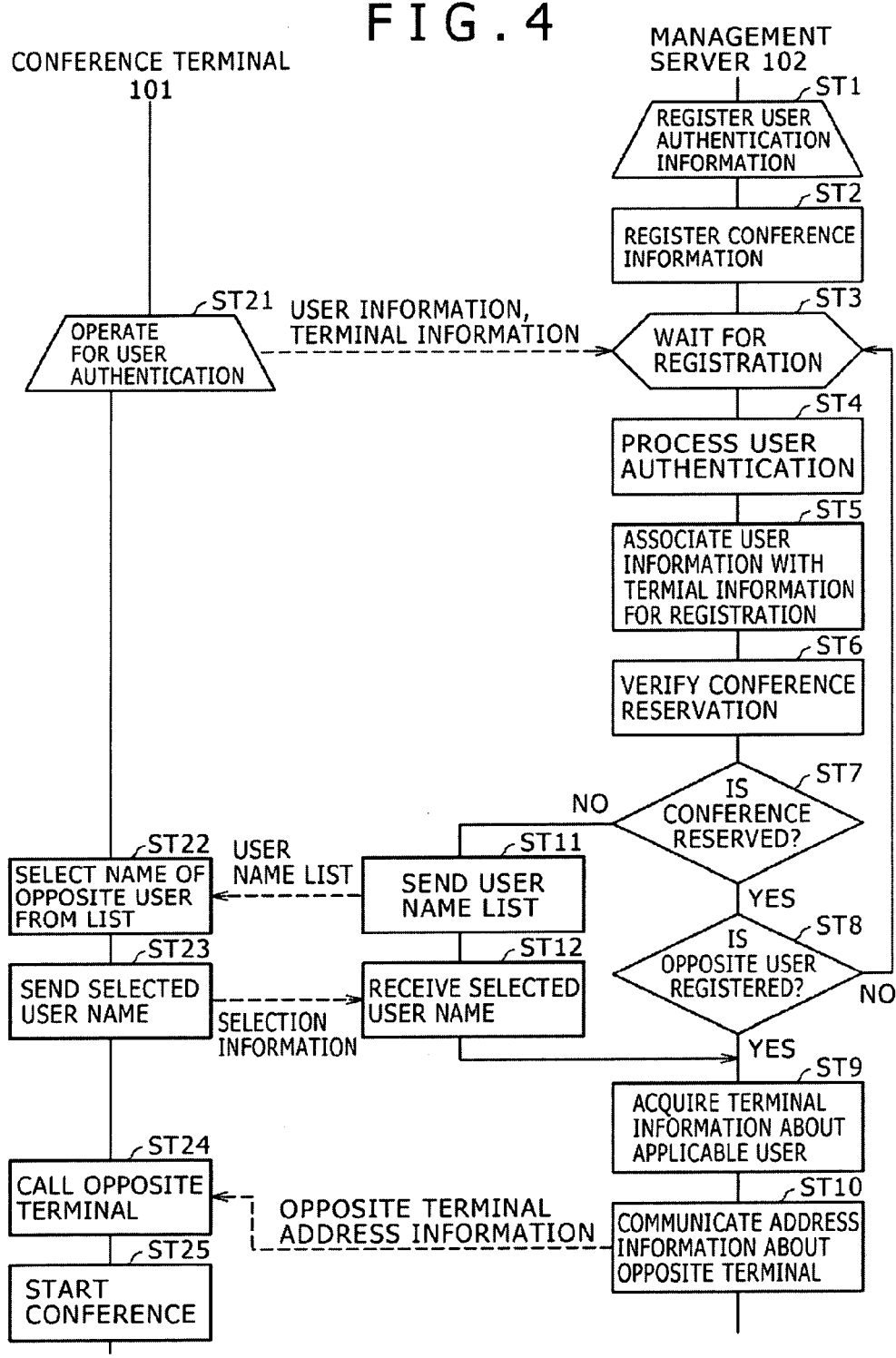

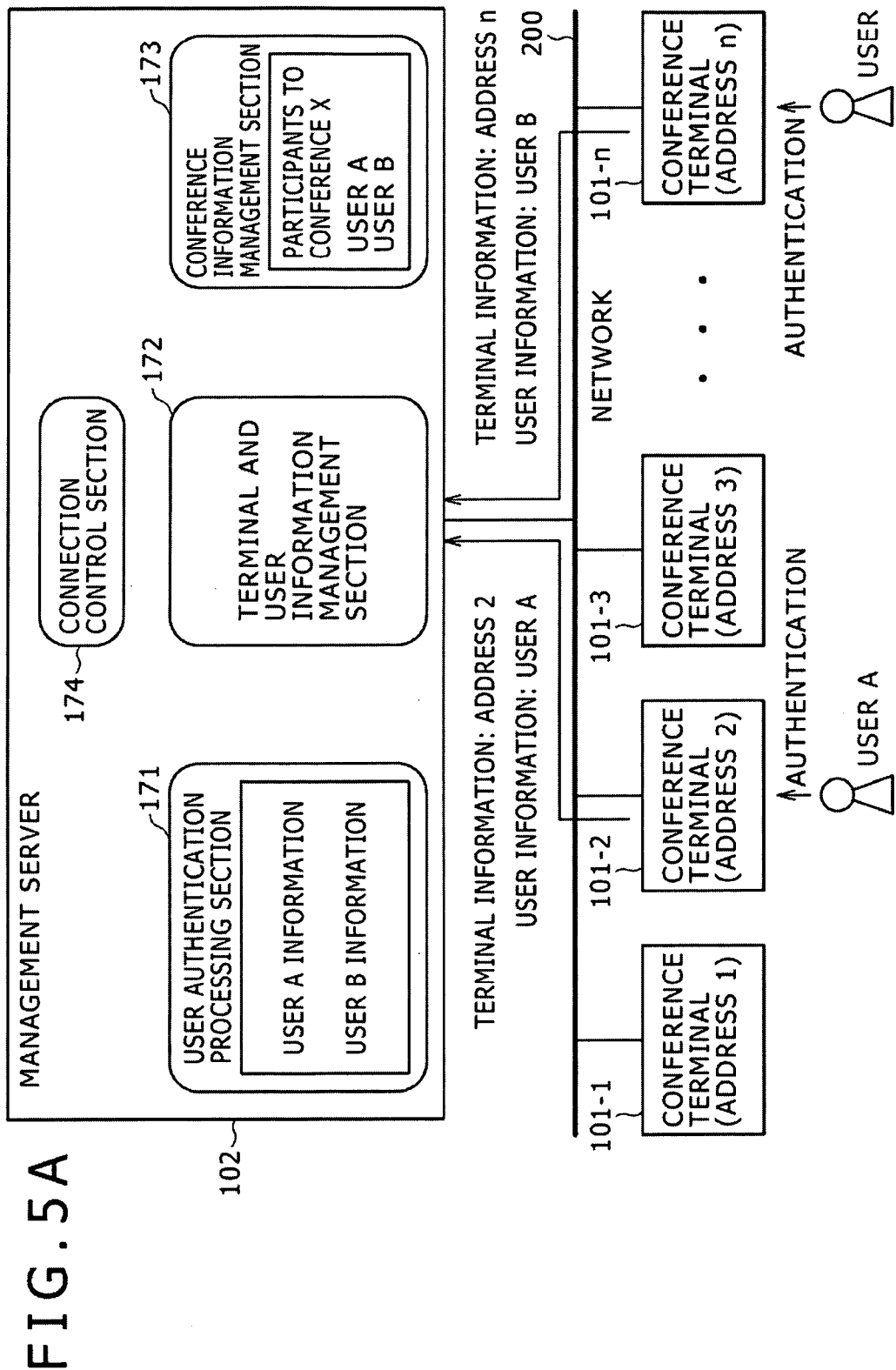

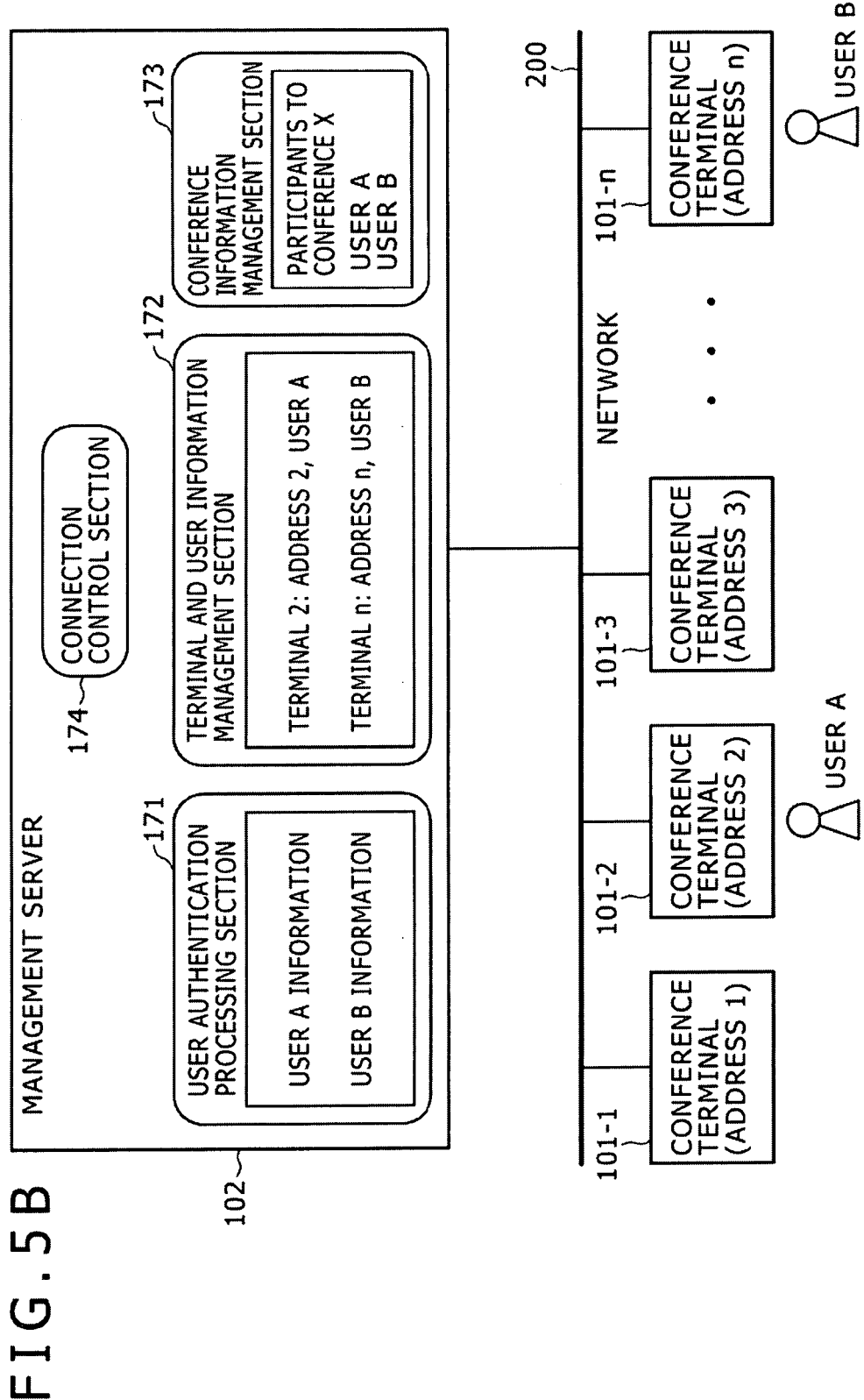

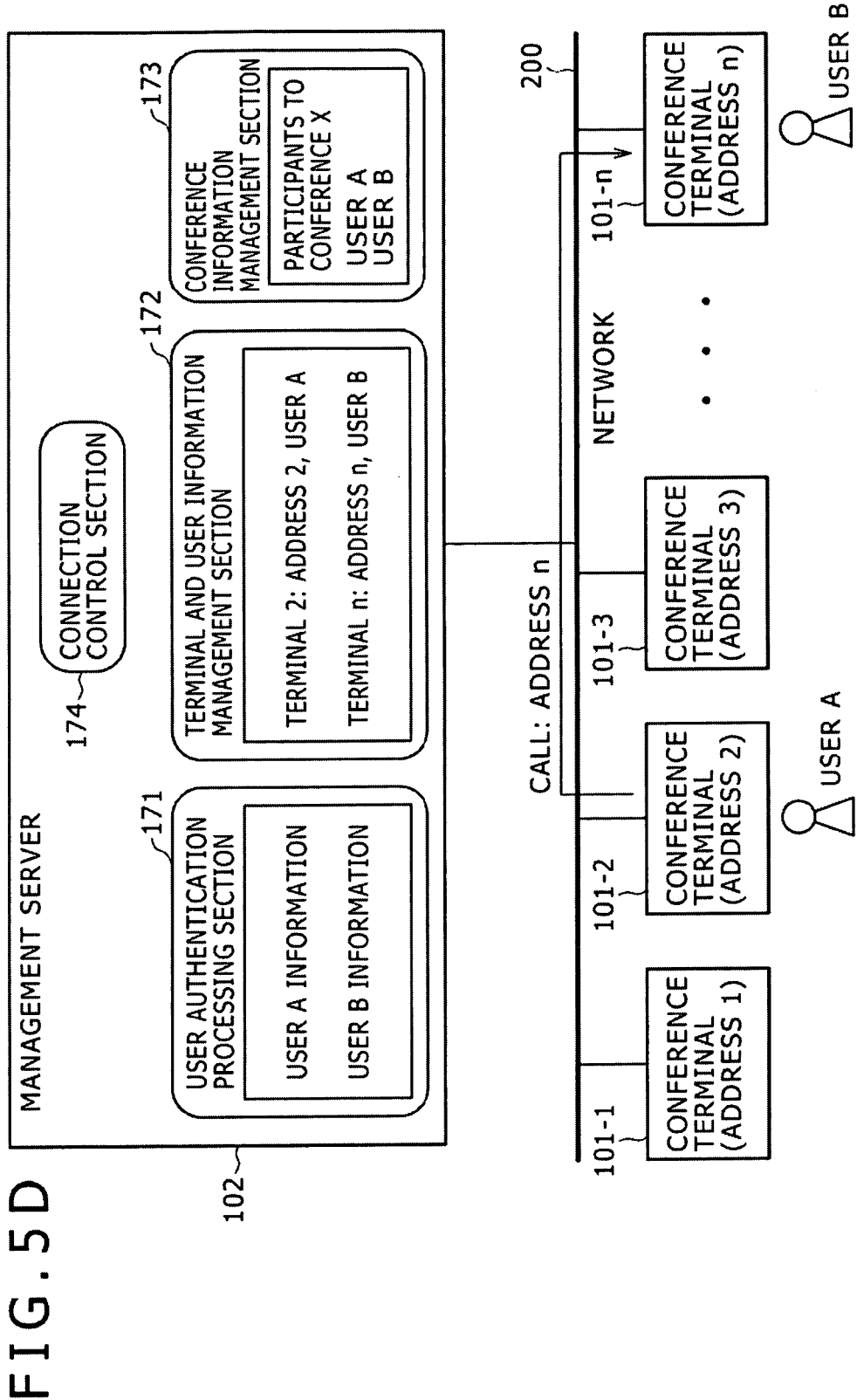

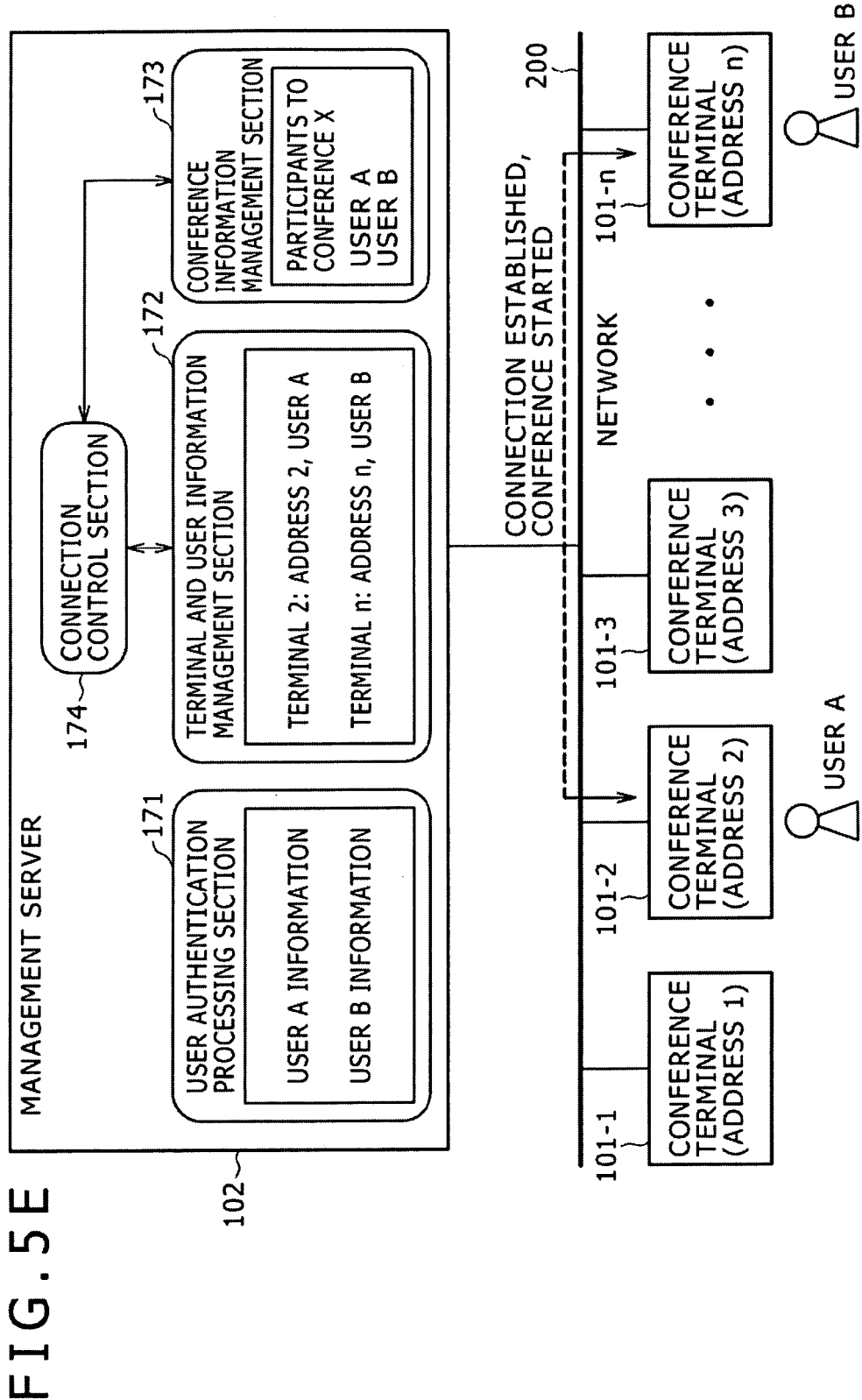

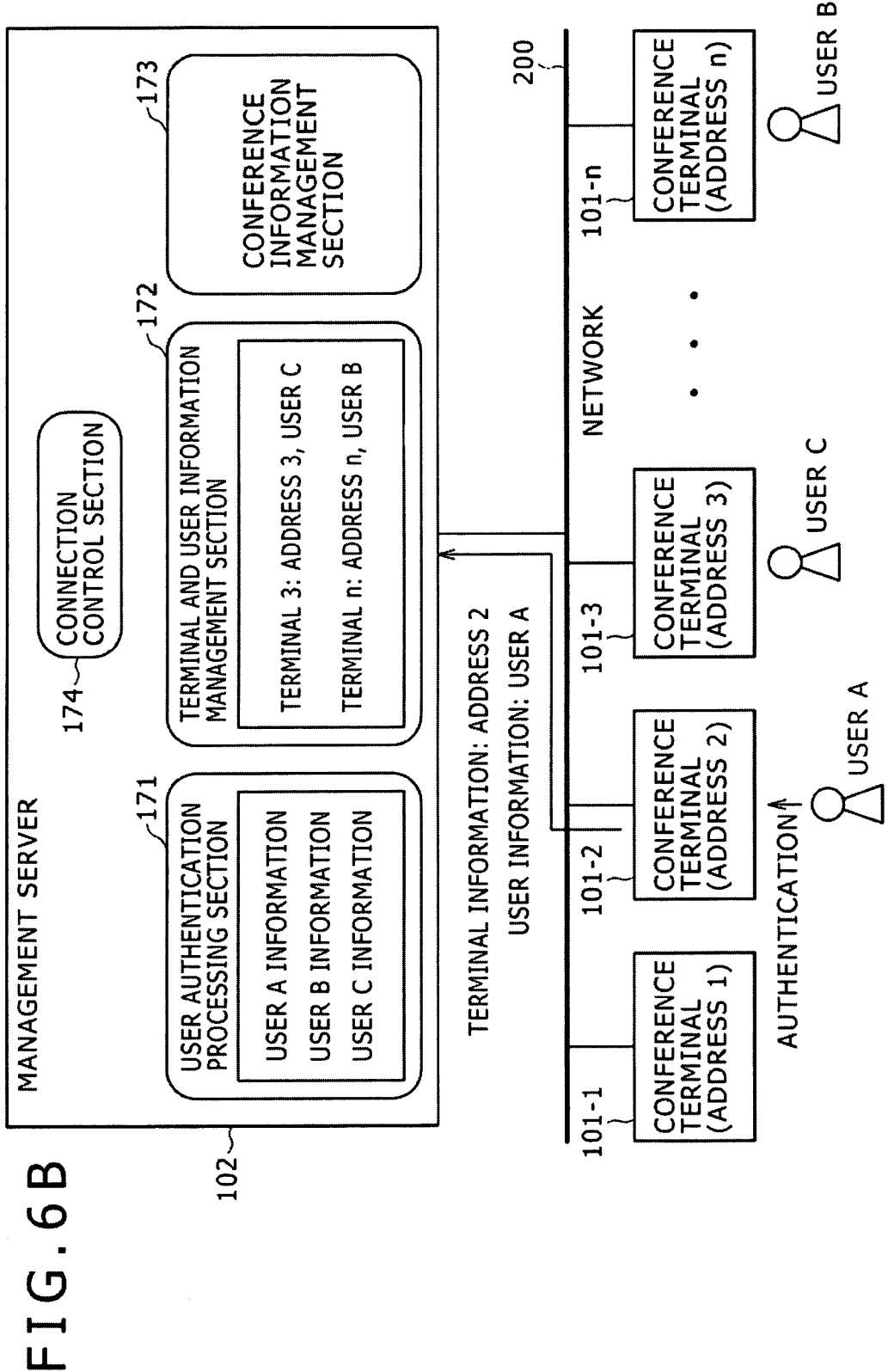

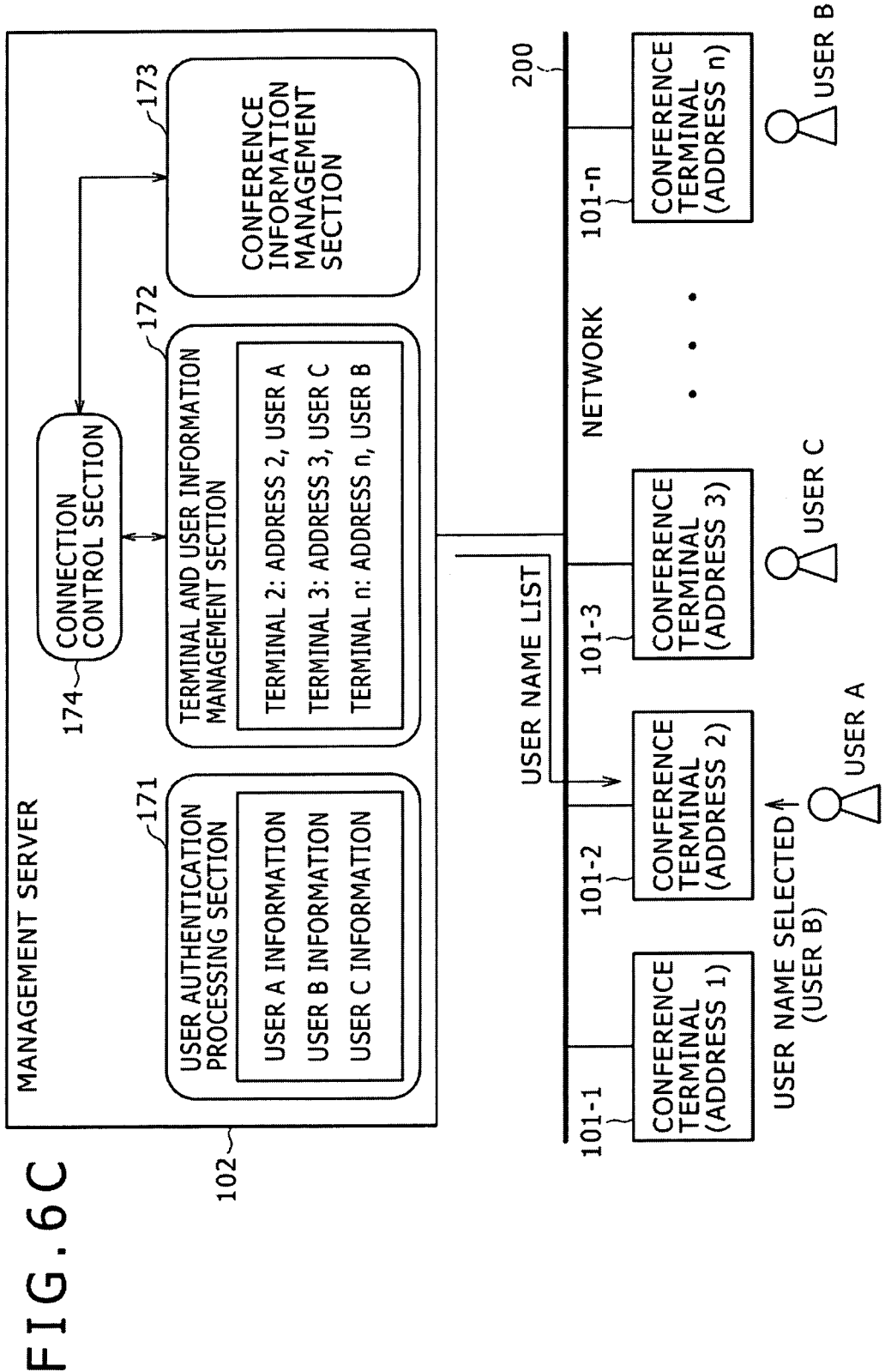

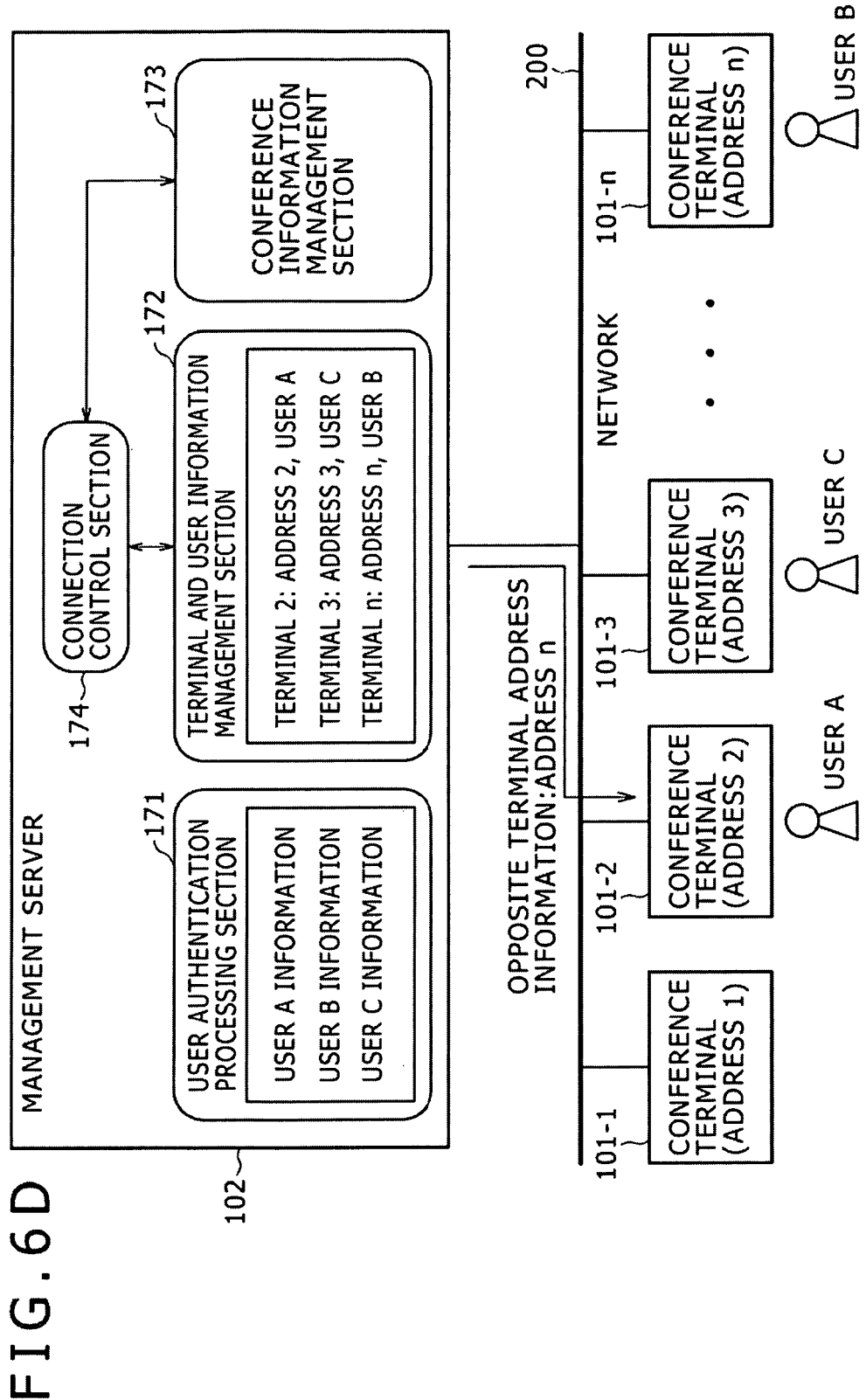

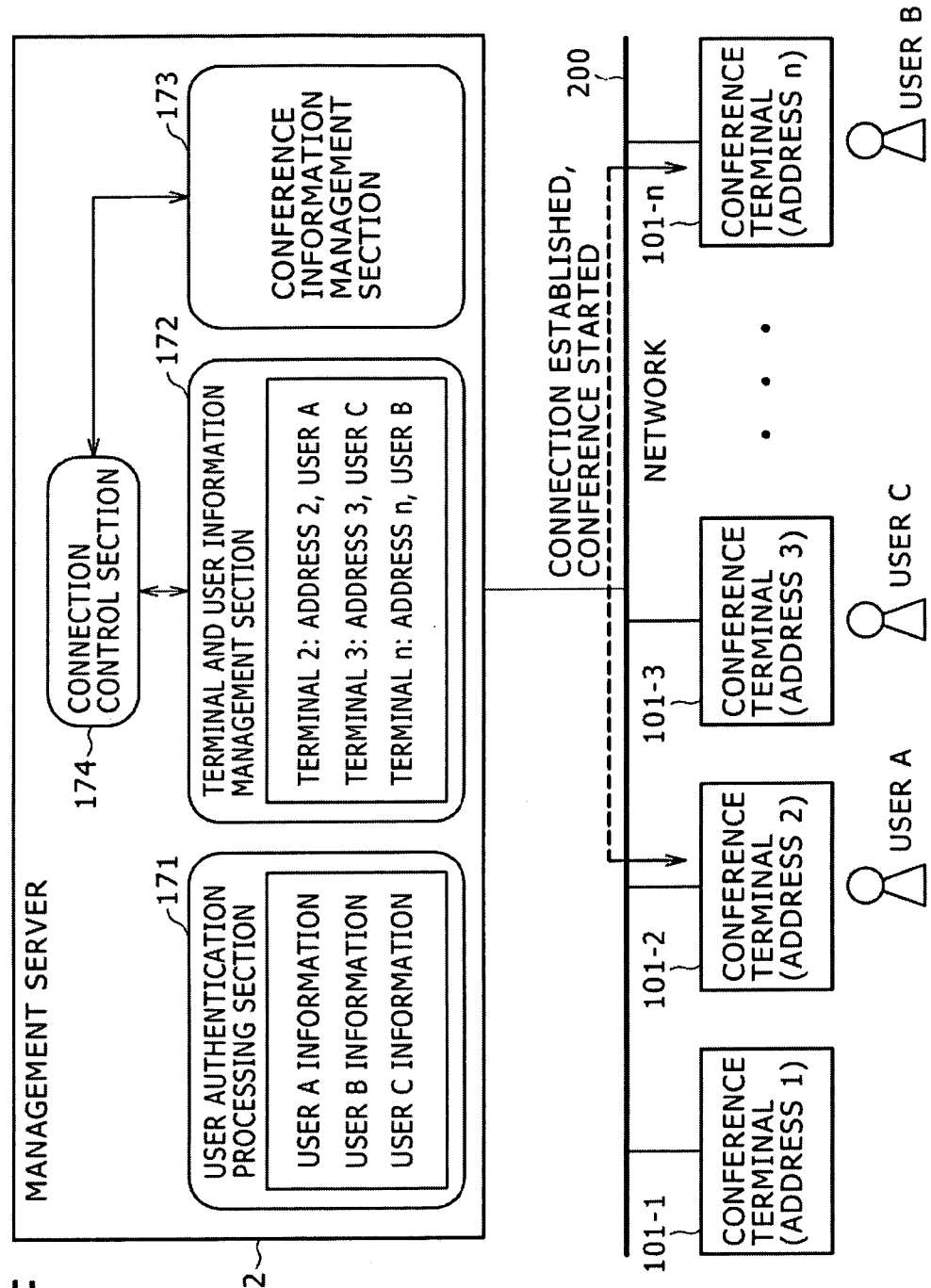

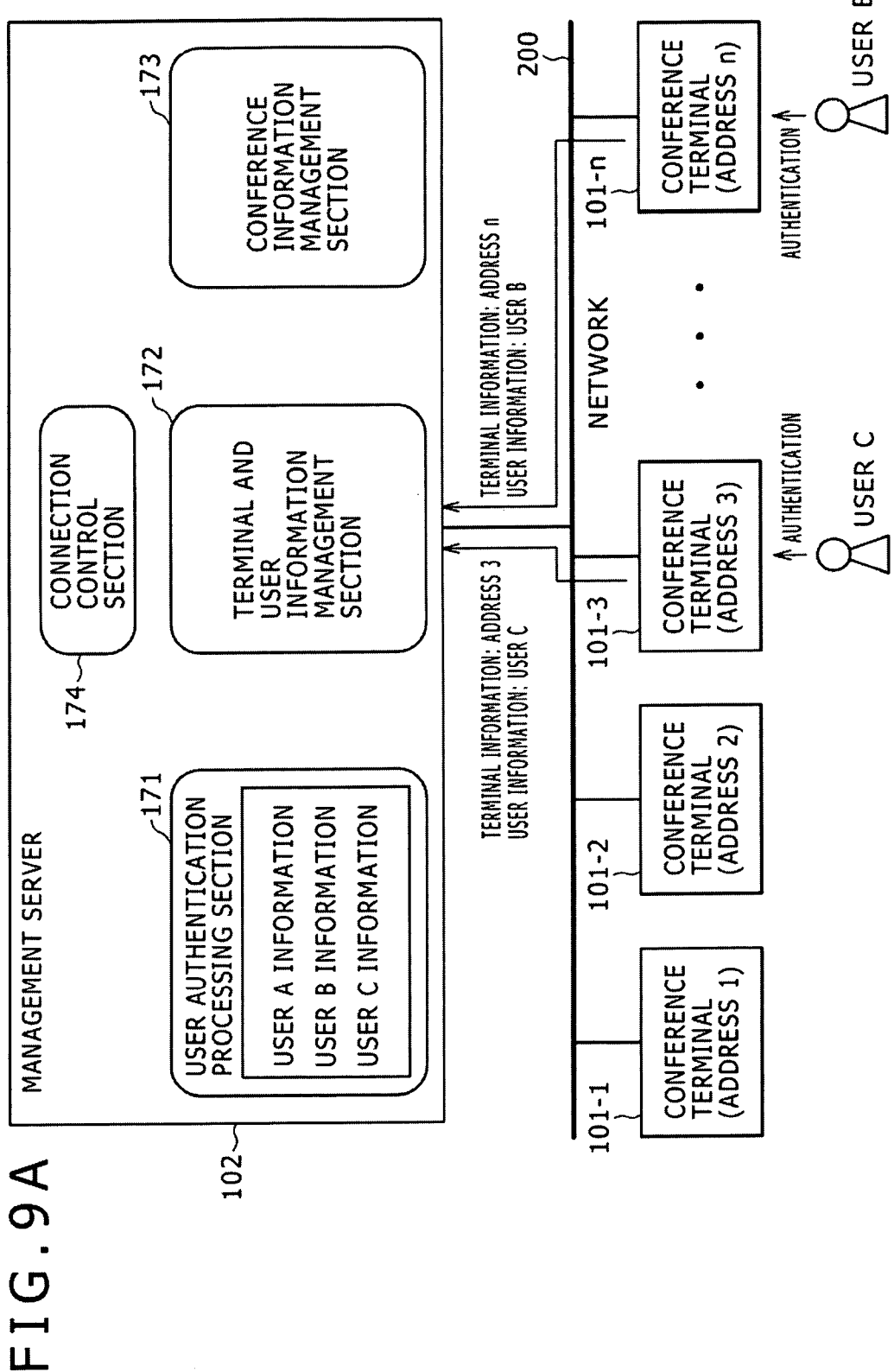

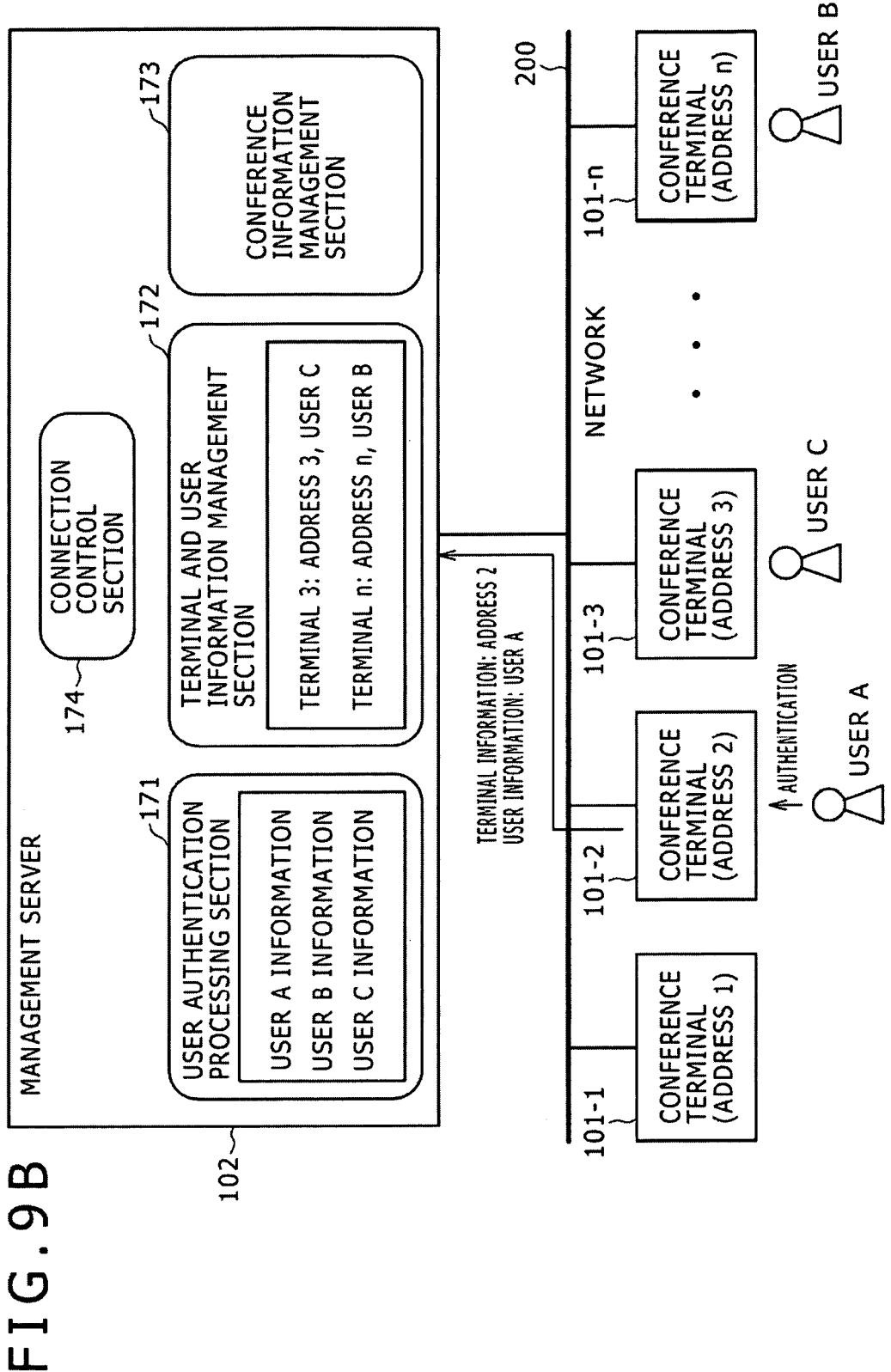

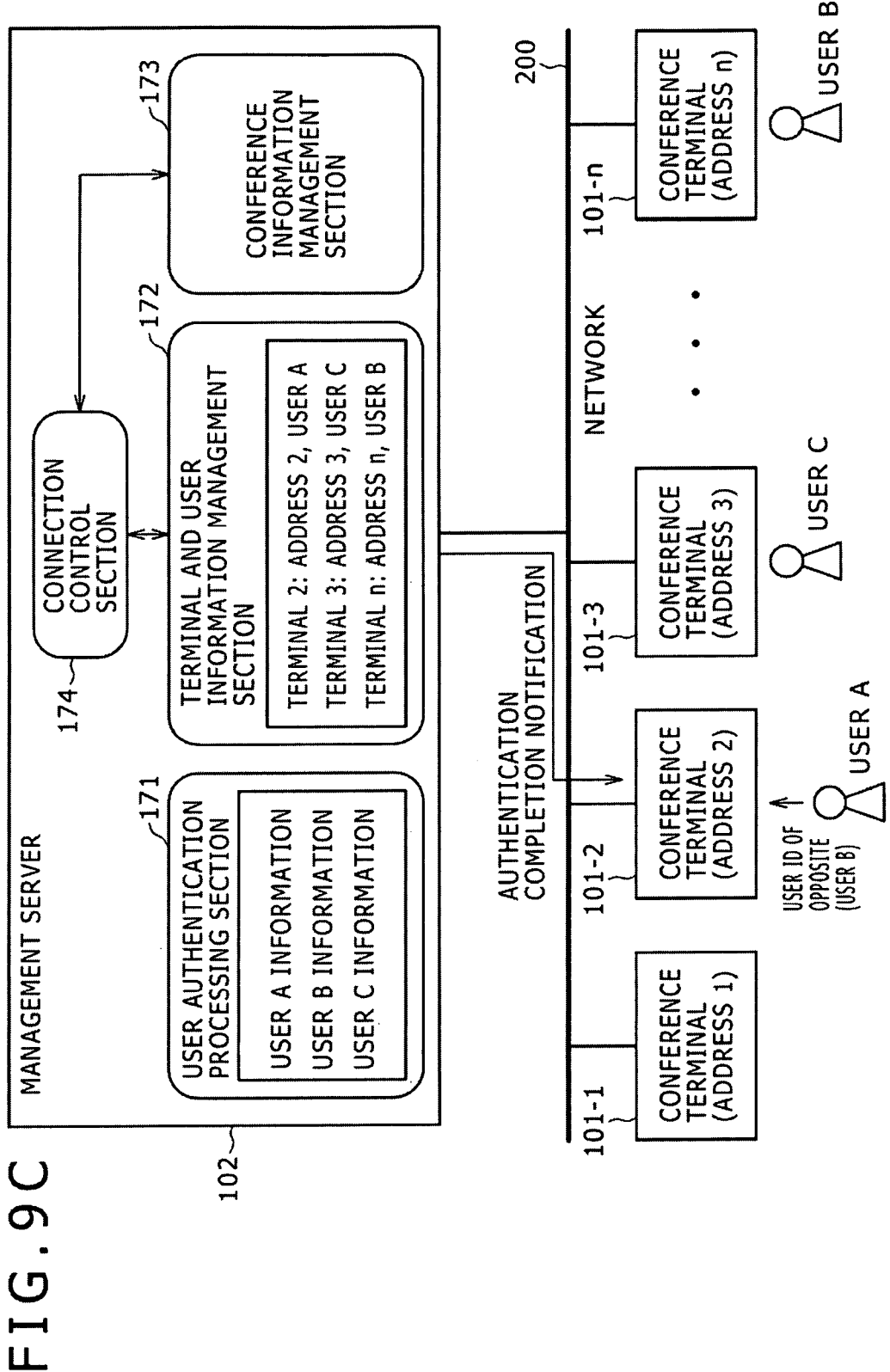

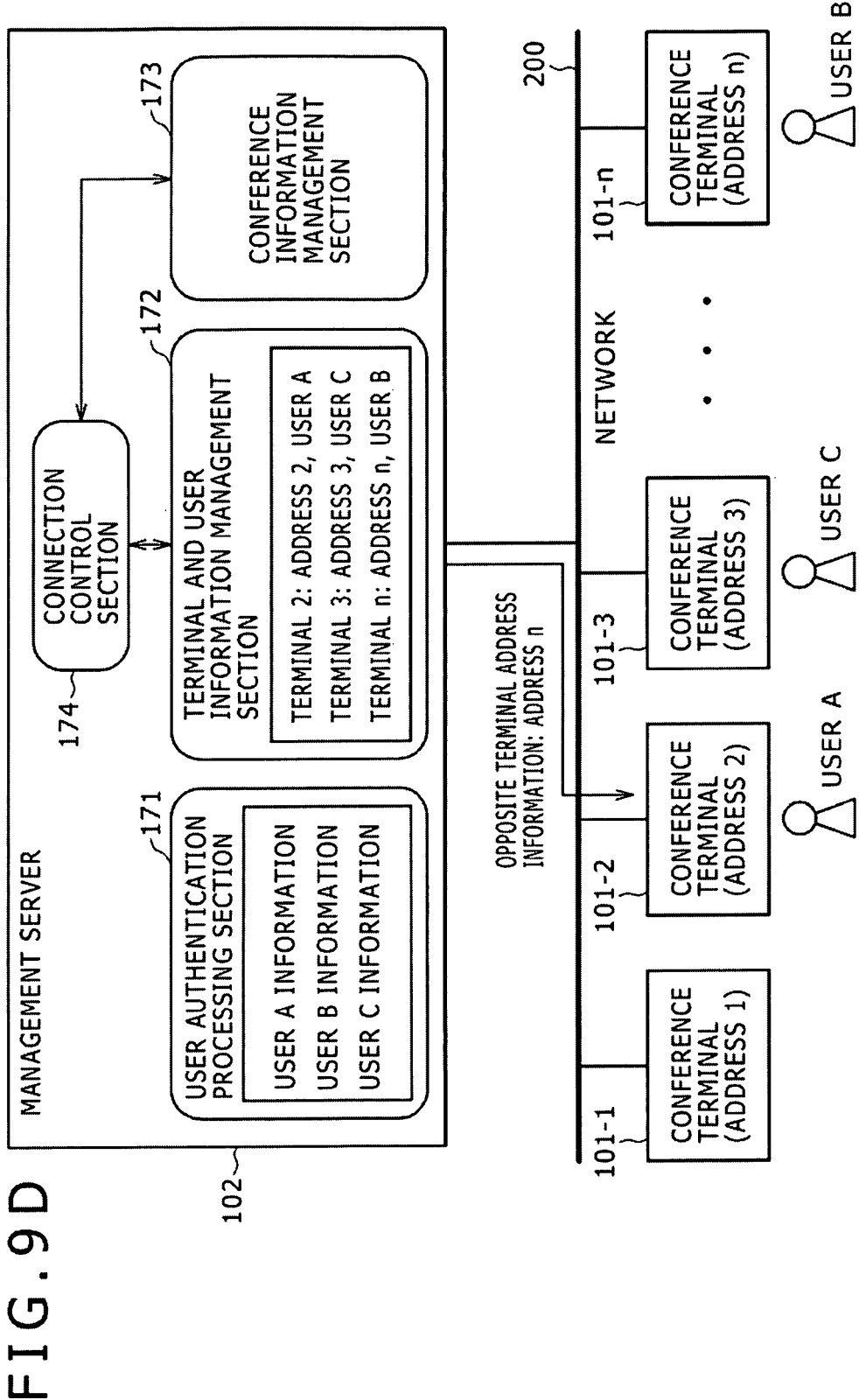

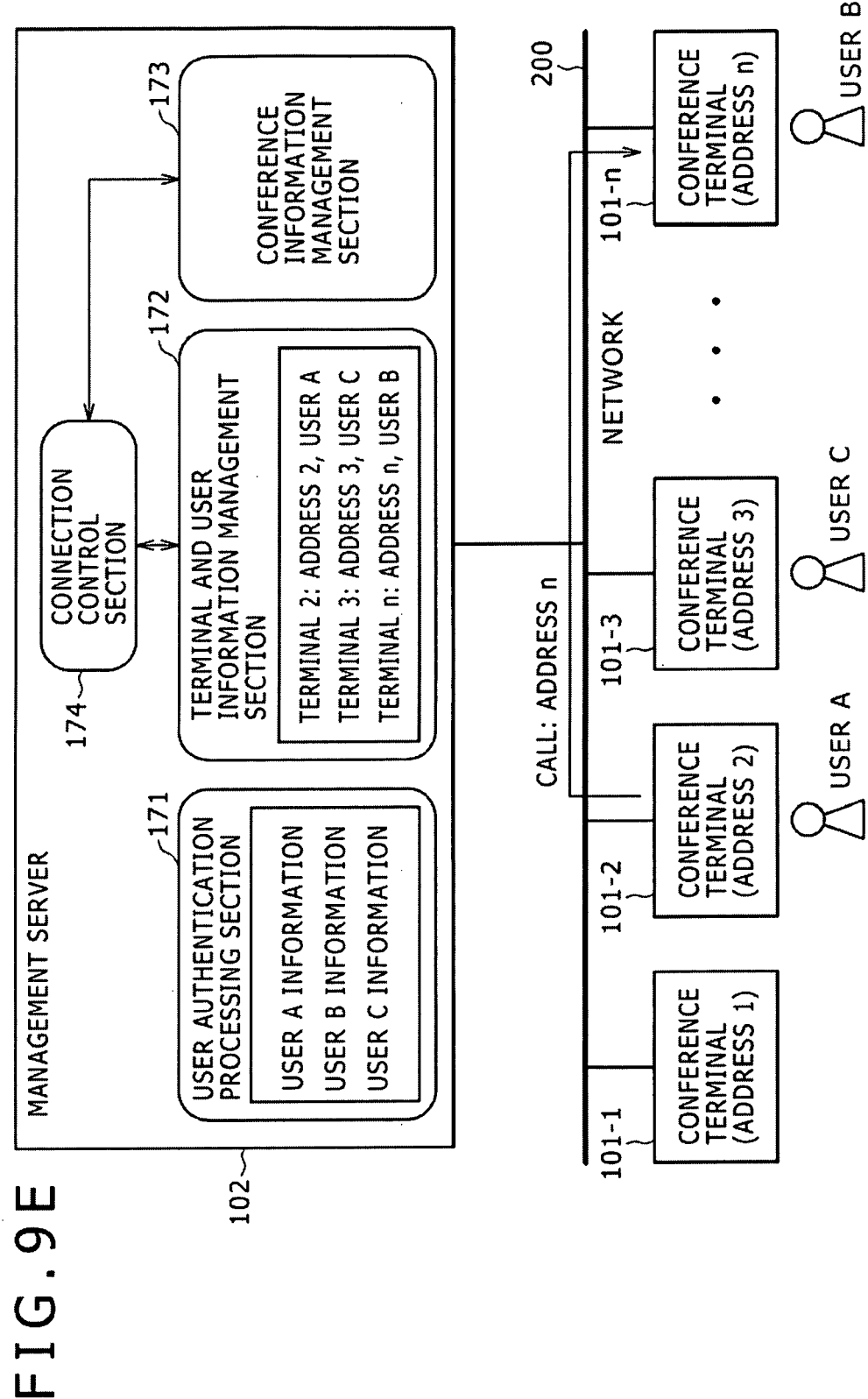

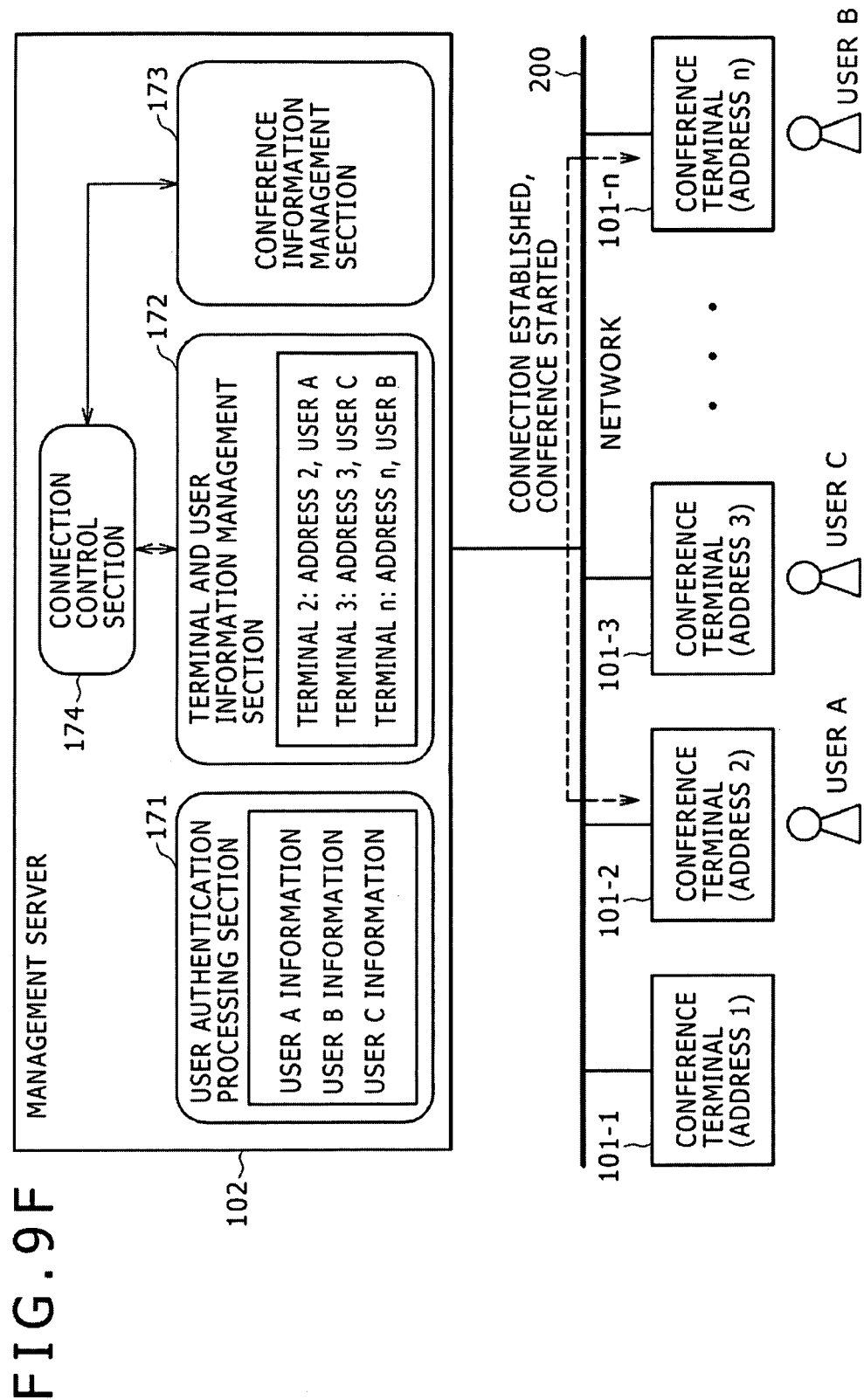

COMMUNICATION SYSTEM, COMMUNICATION SYSTEM MANAGEMENT APPARATUS, TERMINAL CONNECTION CONTROL METHOD, AND PROGRAM

CROSS REFERENCES TO RELATED APPLICATIONS

The present invention contains subject matter related to Japanese Patent Application JP 2007-069168 filed with the Japanese Patent Office on Mar. 16, 2007, the entire contents of which being incorporated herein by reference.

BACKGROUND OF THE INVENTION

1. Field of the Invention

The present invention relates to a communication system, a communication system management apparatus, a terminal connection control method, and a program preferably applicable to, for example, a teleconference system. More particularly, the invention relates to a communication system which allows users of communication terminals desirous of communicating with one another to be interconnected through their terminals connected to a network under control of a management apparatus also connected to the network, in such a manner that each user can communicate with an opposite user utilizing any communication terminal without becoming aware of the opposite user's terminal information such as the address of the communication terminal in use.

2. Description of the Related Art

There exist communication systems each made up of a plurality of communication terminals interconnected via a network for bidirectional communication. One such communication system is disclosed illustratively in Japanese Patent Laid-open No. 2005-328484.

SUMMARY OF THE INVENTION

With the above type of communication system in operation, a user who wishes to start communicating with another user is required beforehand to input through his or her communication terminal the terminal information about the opposite user such as a terminal address of the communication terminal used by the opposite user, whereby the two communication terminals can be interconnected.

Where the user is to connect his or her own communication terminal with the opposite user's communication terminal by use of such terminal information as the address about the latter's terminal as in the case above, the user must acquire the terminal information beforehand in some appropriate means. Every time the opposite user utilizes a different communication terminal, new terminal information must be obtained in suitable fashion.

The present invention has been made in view of the above circumstances and provides arrangements such as to let the user of a communication terminal communicate with an opposite user utilizing any communication terminal, without becoming aware of the opposite user's terminal information such as the address of the communication terminal.

In carrying out the present invention and according to one embodiment thereof, there is provided a communication system including a plurality of communication terminals and a management apparatus interconnected via a network. The management apparatus includes: a user authentication processing section configured to process user authentication in response to an authentication operation performed by a user using any one of the communication terminals. The management apparatus further includes a first information management section configured to manage user information about the user authenticated by the user authentication processing section in association with terminal information about the communication terminal used by the user. The management apparatus even further includes a second information management section configured to manage communication information including the user information about a plurality of users with intent to communicate with one another. The management apparatus still further includes a connection control section configured to be used if the second information management section manages the communication information including the user information about the user authenticated by the user authentication processing section and if the first information management section manages the user information about another user as part of the communication information. Then the connection control section sends the terminal Information about another communication terminal corresponding to the user information about the other user managed by the first information management section, to the communication terminal identified by the terminal information managed by the first information management section in association with the user information about the authenticated user.

According to the embodiment above of the present invention, the plurality of communication terminals and management apparatus are interconnected via the network. The user authentication processing section of the management apparatus processes user authentication in response to the authentication operation performed by the user using any one of the communication terminals. The management apparatus may use an ordinary personal authentication system illustratively based on an authentication scheme utilizing user IDs combined with passwords; on a biometric identification scheme involving palm vein patterns, fingerprints or voiceprints; or on an authentication scheme involving the use of IC cards. The first information management section of the management apparatus registers and manages user information about the user authenticated by the user authentication processing section in association with terminal information about the communication terminal used by the authenticated user. The user information is unique to each user who has been authenticated. Illustratively, the user information may be a user ID, a user name, and/or a user affiliation. The terminal information such as terminal addresses is specific to each communication terminal operated by the user for his or her authentication.

The second information management section of the management apparatus manages communication information including the user information about a plurality of users. Illustratively, the communication information may be constituted by the user information about a plurality of user with intent to communicate with one another and by date information about the dates and times at which communications are to take place.

The communication control section of the management apparatus determines whether or not the second information management section manages the communication information including the user information about the authenticated user and, if that is the case, whether or not the first information management section manages the user information about another user as part of the communication information.

If the second information management section manages the communication information including the user information about the authenticated user and if the first information management section manages the user information about another user as part of the communication information, then the connection control section sends the terminal information about another communication terminal corresponding to the user information about another user managed by the first information management section, to the communication terminal used by the authenticated user. The latter communication terminal is identified by the terminal information managed by the first information management section in association with the user information about the authenticated user. In this case, the communication terminal used by the authenticated user may be connected to the other communication terminal using the terminal information about the latter terminal, so that these communication terminals can communicate with each other for a conference or for other communication purposes.

With the above-described inventive structure in place, each of the users scheduled for communication by the communication information need only perform an authentication operation on any one of the communication terminals interconnected via the network. Under control of the management apparatus connected to the network, the communication terminal operated by one user for his or her authentication may then be connected with another terminal operated by another user for authentication. Each user need not become aware of such terminal information as a terminal address about the communication terminal used by the opposite user; any one of the networked communication terminals may be used by one user to communicate with the opposite user using another terminal on the network.

Preferably, if the second information management section does not manage the communication information including the user information about the user authenticated by the user authentication processing section and if the communication terminal used by the authenticated user is operated to select the other user identified by the user information managed by the first information management section, then the connection control section may send the terminal information about the other communication terminal corresponding to the user information about the other user managed by the first information management section, to the communication terminal used by the authenticated user.

In the preferred structure above, the connection control section of the management apparatus determines whether or not the communication terminal used by the authenticated user is operated to select the other user identified by the user information managed by the first information management section. For example, the connection control section may send a list of user names corresponding to the user information managed by the first information management section, to the communication terminal used by the authenticated user. If selection information about a user name selected from the list is sent from the communication terminal used by the authenticated user, then the connection control section may recognize the selection of the user identified by the user information about the other user managed by the first information management section. Where the connection control section of the management apparatus sends a user name list to the communication terminal used by the authenticated user, the user at the terminal can easily select the user with whom to communicate from the received user name list.

When the communication terminal used by the authenticated user is operated to select the other user identified by the user information managed by the first information management section, the connection control section sends the terminal information about the other communication terminal corresponding to the user information about the other user managed by the first information management section, to the communication terminal used by the authenticated user. In this case, the communication terminal used by the authenticated user may be connected to the other communication terminal using the terminal information about the latter terminal, so that these communication terminals can communicate with each other for a conference or for other communication purposes.

With the preferred inventive structure above in use, the authenticated user need only select another user as desired from among the users who have been authenticated and registered. Under control of the management apparatus connected to the network, each user can then connect the communication terminal used for his or her authentication with the communication terminal used by another user for authentication. Each user need not become aware of such terminal information as a terminal address about the communication terminal used by the opposite user; any one of the networked communication terminals may be used by one user to communicate with the opposite user using another terminal on the network.

In another preferred structure of the present invention, if the second information management section does not manage the communication information including the user information about the user authenticated by the user authentication processing section, if the communication terminal used by the authenticated user is operated to select an opposite user, and if the first information management section manages the user information about the other user corresponding to the opposite user, then the connection control section may send the terminal information about the other communication terminal corresponding to the user information about the other user managed by the first information management section, to the communication terminal used by the authenticated user.

In the preferred structure above, the connection control section of the management apparatus determines whether or not the opposite user is selected by the communication terminal used by the authenticated user. For example, if the connection control section sends an authentication completion notification to the communication terminal used by the authenticated user and if the user information about the opposite user is sent from the communication terminal used by the authenticated user, then the connection control section recognizes the selection of the opposite user. In this case, the authenticated user using the communication terminal may freely select the opposite user with whom to communicate.

If the communication terminal used by the authenticated user is operated to select the opposite user and if the first information management section manages the user information about the other user corresponding to the opposite user, then the connection control section may send the terminal information about the other communication terminal corresponding to the user information about the other user managed by the first information management section, to the communication terminal used by the authenticated user. In this case, the communication terminal used by the authenticated user may be connected to the other communication terminal using the terminal information about the latter terminal, so that these communication terminals can communicate with each other for a conference or for other communication purposes.

With the preferred inventive structure above in use, the authenticated user need only select the opposite user. Under control of the management apparatus connected to the network, each user can then connect the communication terminal used for his or her authentication with the communication terminal used by the opposite user for authentication. Each user need not become aware of such terminal information as a terminal address about the communication terminal used by the opposite user; any one of the networked communication terminals may be used by one user to communicate with the opposite user using another terminal on the network.

According to another embodiment of the present invention, there is provided a communication system including a plurality of communication terminals and a management apparatus interconnected via a network. The management apparatus includes: a user authentication processing section configured to process user authentication in response to an authentication operation performed by a user using any one of the communication terminals; an information management section configured to manage user information about the user authenticated by the user authentication processing section in association with terminal information about the communication terminal used by the user; and a connection control section. If another user identified by the user information managed by the information management section is selected by the communication terminal identified by the terminal information managed by the information management section in association with the user information about the user authenticated by the user authentication processing section, the connection control section configured to be used to send the terminal information about the communication terminal used by the other user corresponding to the user information managed by the information management section, to the communication terminal used by the authenticated user.

According to the embodiment above of the present invention, the plurality of communication terminals and management apparatus are interconnected via the network. The user authentication processing section of the management apparatus processes user authentication in response to the authentication operation performed by the user using any one of the communication terminals. The information management section of the management apparatus registers and manages the user information about the authenticated user and the terminal information about the terminal used by that user.

The connection control section of the management apparatus determines whether or not the other user identified by the user information managed by the information management section is selected by the communication terminal identified by the terminal information managed by the information management section in association with the user information about the user authenticated by the user authentication processing section.

If the other user identified by the user information managed by the information management section is selected by the communication terminal used by the authenticated user, then the connection control section sends the terminal information about the communication terminal used by the other user corresponding to the user information managed by the information management section, to the communication terminal used by the authenticated user. In this case, the communication terminal used by the authenticated user may be connected to the other communication terminal using the terminal information about the latter terminal, so that these communication terminals can communicate with each other for a conference or for other communication purposes.

Where the inventive structure above is in use, the authenticated user need only select another user as desired from among the users who have been authenticated and registered. Under control of the management apparatus connected to the network, each user can then connect the communication terminal used for his or her authentication with the communication terminal used by another user for authentication. Each user need not become aware of such terminal information as a terminal address about the communication terminal used by the opposite user; any one of the networked communication terminals may be used by one user to communicate with the opposite user using another terminal on the network.

According to a further embodiment of the present invention, there is provided a communication system including a plurality of communication terminals and a management apparatus interconnected via a network. The management apparatus includes: a user authentication processing section configured to process user authentication in response to an authentication operation performed by a user using any one of the communication terminals; an information management section configured to manage user information about the user authenticated by the user authentication processing section in association with terminal information about the communication terminal used by the user. The management apparatus further includes a connection control section configured to be used if an opposite user is selected by the communication terminal identified by the terminal information managed by the information management section in association with the user information about the user authenticated by the user authentication processing section and if the information management section manages the user information about the other user corresponding to the opposite user, the connection control section then sending the terminal information about another communication terminal corresponding to the user information about the other user managed by the information management section, to the communication terminal used by the authenticated user.

According to the above-outlined embodiment of the present invention, the plurality of communication terminals and management apparatus are also interconnected via the network. The user authentication processing section of the management apparatus processes user authentication in response to the authentication operation performed by the user using any one of the communication terminals. The information management section of the management apparatus registers and manages the user information about the authenticated user and the terminal information about the terminal used by that user.

The connection control section of the management apparatus determines whether or not the opposite user is selected by the communication terminal identified by the terminal information managed by the information management section in association with the user information about the user authenticated by the user authentication processing section. For example, if the connection control section sends an authentication completion notification to the communication terminal used by the authenticated user and if the user information about the opposite user is sent from the communication terminal used by the authenticated user, then the connection control section recognizes the selection of the opposite user. In this case, the authenticated user using the communication terminal may freely select the opposite user with whom to communicate.

If the communication terminal used by the authenticated user is operated to select the opposite user and if the information management section manages the user information about the other user corresponding to the opposite user, then the connection control section sends the terminal information about the other communication terminal corresponding to the user information about the other user managed by the information management section, to the communication terminal used by the authenticated user. In this case, the communication terminal used by the authenticated user may be connected to the other communication terminal using the terminal information about the latter terminal, so that these communication terminals can communicate with each other for a conference or for other communication purposes.

Where the inventive structure above is in use, the authenticated user need only select the opposite user. Under control of the management apparatus connected to the network, each user can then connect the communication terminal used for his or her authentication with the communication terminal used by the opposite user for authentication. Each user need not become aware of such terminal information as a terminal address about the communication terminal used by the opposite user; any one of the networked communication terminals may be used by one user to communicate with the opposite user using another terminal on the network.

Preferably, if the user information about the other user is not managed by the information management section, then the connection control section may send to the communication terminal used by the authenticated user a query about whether or not to reserve communication with the other user identified by the user information about that other user. If the communication terminal used by the authenticated user returns a response saying that the communication will be reserved in reply to the inquiry from the communication terminal used by the authenticated user, then the connection control section may register the communication information including the user information about the authenticated user and the user information about the other user. In this case, when the opposite user identified by the user information about that user is authenticated and registered, the connection control section can exercise connection control using the communication information including that information.

BRIEF DESCRIPTION OF THE DRAWINGS

FIG. 4 is a flowchart of steps performed when a conference terminal proceeds to connect with another terminal under control of the management server;

FIG. 5A is one schematic view showing how the management server and conference terminals typically operate when conference information is managed by a conference information management section of the management server;

FIG. 5B is another schematic view showing how the management server and conference terminals typically operate when the conference information is managed by the conference information management section of the management server;

FIG. 5D is an even further schematic view showing how the management server and conference terminals typically operate when the conference information is managed by the conference information management section of the management server;

FIG. 5E is a still further schematic view showing how the management server and conference terminals typically operate when the conference information is managed by the conference information management section of the management server;

FIG. 6B is another schematic view showing how the management server and conference terminals typically operate when the conference information is not managed by the conference information management section of the management server;

FIG. 6C is a further schematic view showing how the management server and conference terminals typically operate when the conference information is not managed by the conference information management section of the management server;

FIG. 6D is an even further schematic view showing how the management server and conference terminals typically operate when the conference information is not managed by the conference information management section of the management server;

FIG. 6F is a yet further schematic view showing how the management server and conference terminals typically operate when the conference information is not managed by the conference information management section of the management server;

FIG. 9A is another schematic view showing how the management server and conference terminals typically operate when the conference information is not managed by the conference information management section of the management server;

FIG. 9B is a further schematic view showing how the management server and conference terminals typically operate when the conference information is not managed by the conference information management section of the management server;

FIG. 9C is an even further schematic view showing how the management server and conference terminals typically operate when the conference information is not managed by the conference information management section of the management server;

FIG. 9D is a still further schematic view showing how the management server and conference terminals typically operate when the conference information is not managed by the conference information management section of the management server;

FIG. 9E is a yet further schematic view showing how the management server and conference terminals typically operate when the conference information is not managed by the conference information management section of the management server; and FIG. 9F is another schematic view showing how the management server and conference terminals typically operate when the conference information is not managed by the conference information management section of the management server.

DETAILED DESCRIPTION OF THE PREFERRED EMBODIMENTS

Preferred embodiments of the present invention will now be described in reference to the accompanying drawings.

Figure 1:
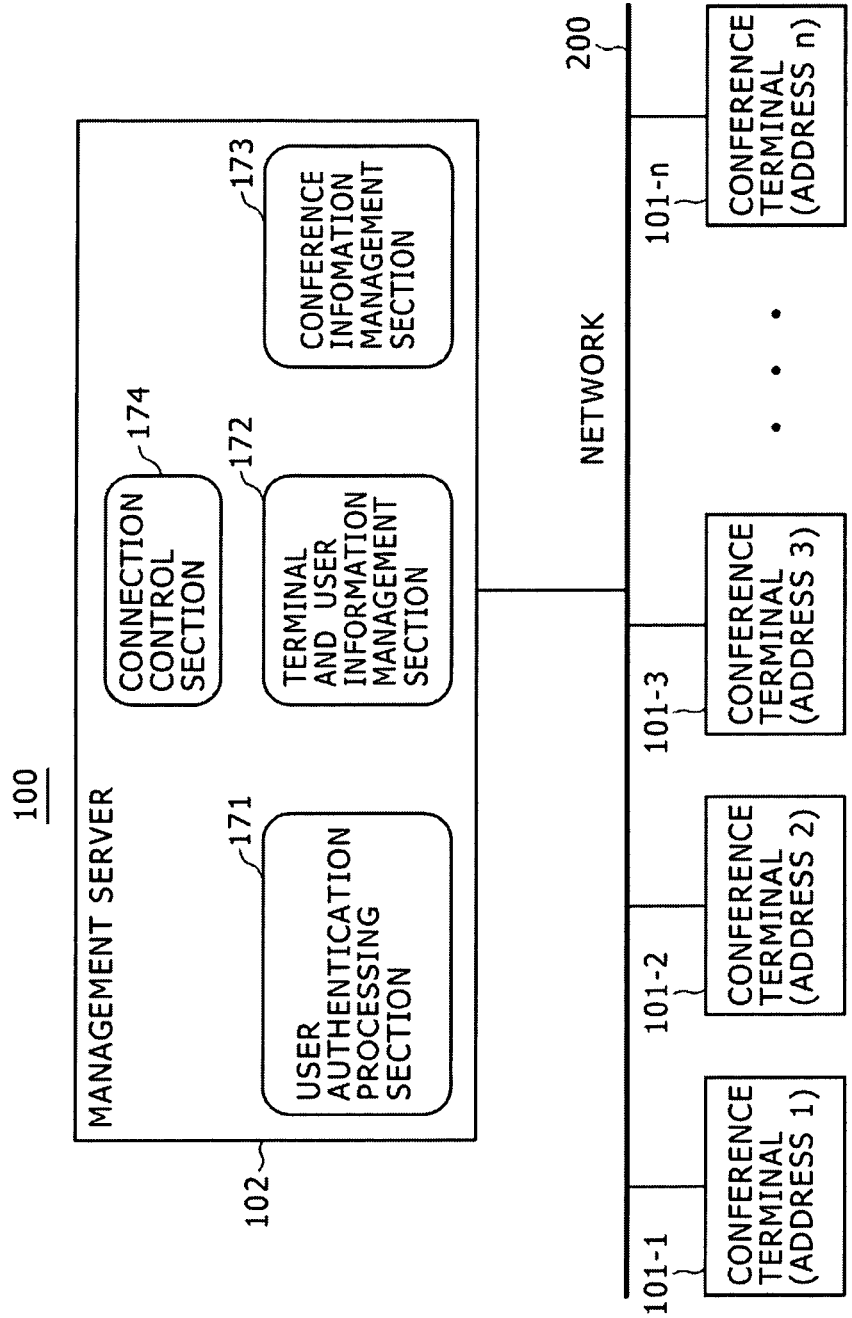
FIG. 1 is a block diagram showing a typical configuration of a conference system embodying the present invention.

FIG. 1 schematically shows a typical configuration of a conference system 100 implemented as a communication system embodying the present invention. The conference system 100 is made up of a plurality of conference terminals 101-1 through 101-n and a management server 102 acting as a management apparatus, all interconnected via a network 200 such as the Internet. The conference terminals 101-1 through 101-n each serve as a communication terminal. The conference terminals 101-1 through 101-n are respectively assigned address 1 through address "n" which constitute terminal information.

Figure 2:
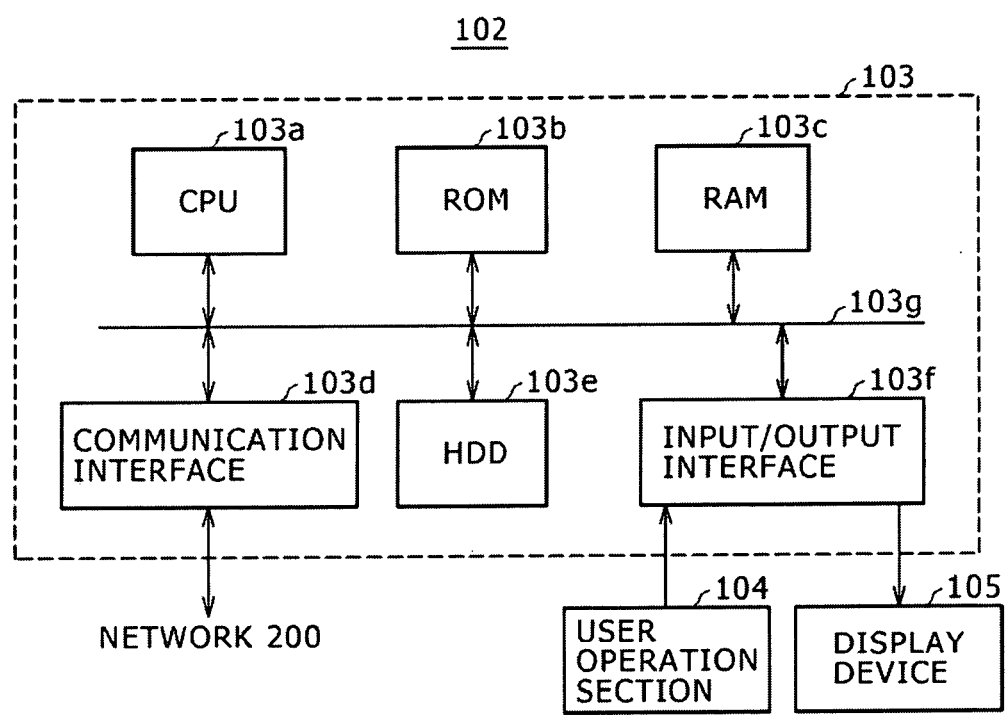
FIG. 2 is a block diagram showing a typical structure of a management server.

FIG. 2 schematically depicts a typical structure of the management server 102. The management server 102 is composed of a computer proper 103, a user operation section 104, and a display device 105. The computer proper 103 has a CPU (central processing unit) 103a, a ROM (read only memory) 103b, a RAM (random access memory) 103c, a communication interface 103d, a hard disk drive (HDD) 103e, and an input/output interface 103f interconnected via an internal bus 103g. The user operation section 104 is connected to the input/output interface 103f and includes a keyboard and a mouse. The display device 105 is typically formed by an LCD (liquid crystal display) or a PDP (plasma display panel).

In the computer proper 103, the CPU 103a reads control programs as needed from the ROM 103b or elsewhere, transfers the retrieved control programs to the RAM 103e for expansion, and accesses and executes the expanded control programs to control relevant components of the computer. The communication interface 103d allows the computer 103 to communicate with the conference terminals 101-1 through 101-n over the network 200.

Figure 3:
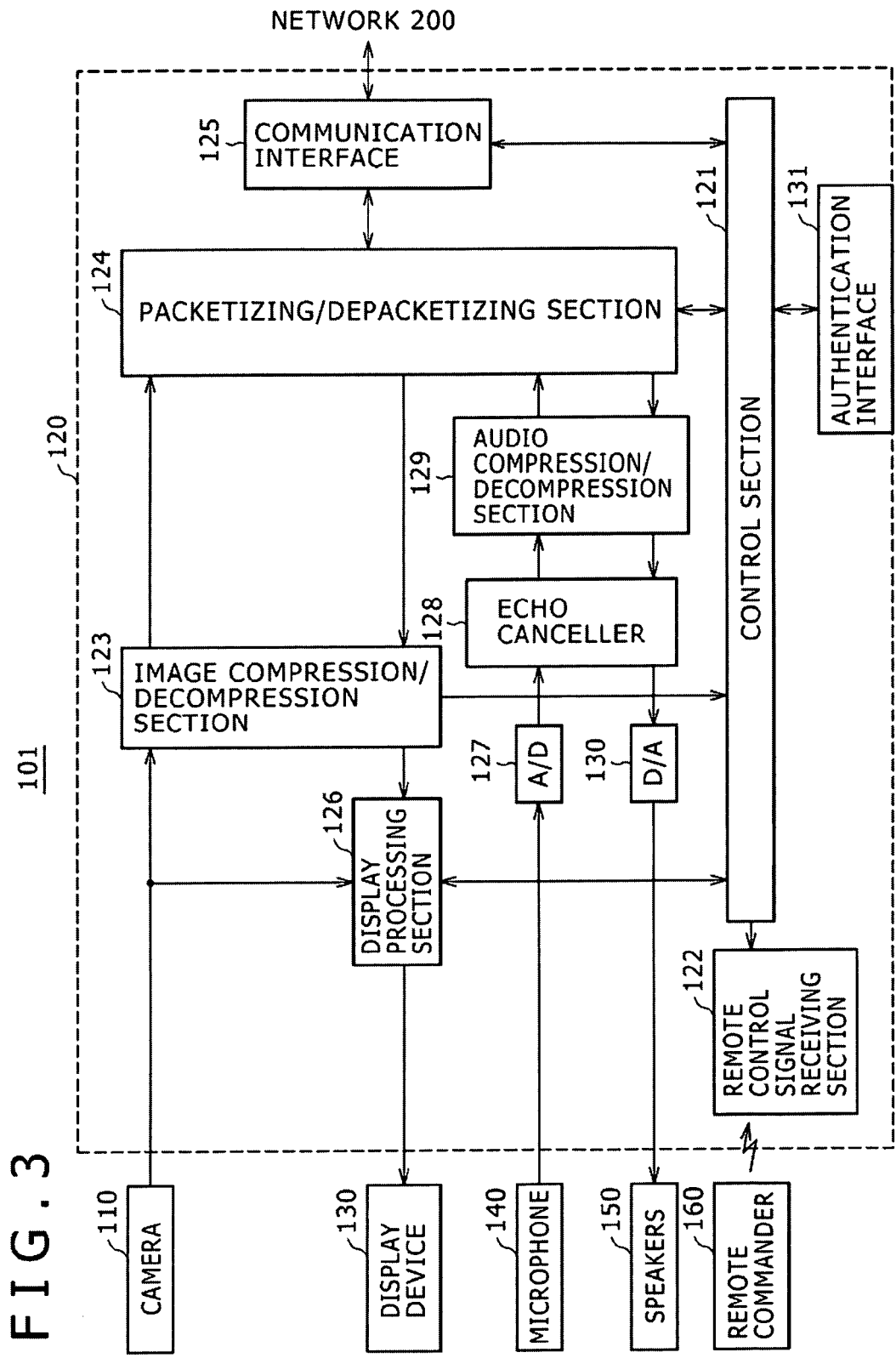
FIG. 3 is a block diagram showing a typical structure of a conference terminal.

FIG. 3 schematically shows a typical structure of a conference terminal 101 (each of the terminals 101-1 through 101-n). The conference terminal 101 includes a camera 110, a terminal proper 120, a display device 130, a microphone 140, speakers 150, and a remote commander 160. The camera 110 picks up images of an object and outputs image data representative of the object in question.

The terminal proper 120 includes a control section 121, a remote control signal receiving section 122, an image compression/decompression section 123, a packetizing/depacketizing section 124, a communication interface 125, a display processing section 126, an A/D converter 127, an echo canceller 128, an audio compression/decompression section 129, a D/A converter 130, and an authentication interface 131.

The control section 121 controls the components of the terminal proper 120 in operation. The remote control signal receiving section 122 receives remote control signals such as infrared signals that are generated by the remote commander 160 in response to the user's operations. The remote control signal receiving section 122 proceeds to supply the control section 121 with operation signals representative of the received remote control signals.

The authentication interface 131 connected to the control section 121 serves as a user interface through which the user may perform operations for authentication. The authentication interface 131 allows the user to carry out authentication operations based on an authentication scheme utilizing user IDs combined with passwords; on a biometric identification scheme involving vein patterns, fingerprints or voiceprints; or on an authentication scheme involving the use of IC cards.

The image compression/decompression section 123 compresses the image data output by the camera 110 in accordance with a predetermined compression standard such as H.323 stipulated by the ITU, so as to create compressed image data (i.e., compression-encoded image data). The image compression/decompression section 123 further decompresses compressed image data which comes from another conference terminal 101 and which has been reconstituted by the packetizing/depacketizing section 124, in order to create decompressed image data (i.e., received image data).

The packetizing/depacketizing section 124 packetizes in a predetermined format the compressed image data created by the image compression/decompression section 123 as well as the compressed audio data acquired by the audio compression/decompression section 129. The packet data thus obtained is output to the communication interface 125. The packetizing/depacketizing section 124 further extracts compressed image data and compressed audio data from the packet data coming from another conference terminal 101, and forwards the extracted compressed image data to the image compression/decompression section 123 while outputting the extracted compressed audio data to the audio compression/decompression section 129.

The communication interface 125 sends the packet data acquired by the packet zing/depacketizing section 124 to the other conference terminal 101 over the network 200. The communication interface 125 further receives packet data coming from the other conference terminal 101 over the network 200 and forwards the received data to the packetizing/depacketizing section 124.

The display processing section 126 is supplied with the image data from the camera 110 as well as the decompressed image data (received image data) obtained by the image compression/decompression section 123. The display processing section 126 forwards the received or supplied image data either unmodified or processed to the display device 130.

For example, during communication with another conference terminal 101 in a full-screen display setup, the display processing section 126 supplies the display device 130 with the unmodified received image data as acquired by the image compression/decompression section 123. In this case, the display device 130 gives a full-screen display of the image represented by the image data received from the other conference terminal 101.

In another example involving communication with another conference terminal 101 in a two-screen display setup, the display processing section 126 creates new image data for displaying two kinds of image data in juxtaposed fashion on the same screen, the two kinds of image data being composed of the received image data obtained by the image compression/decompression section 123 and of the image data output by the camera 110. The new image data thus created is supplied to the display device 130. In this case, the display device 130 illustratively displays two images side by side, one image being derived from the image data received from the other conference terminal 101, the other image representing the image data being sent to the other conference terminal 101.

The A/D converter 127 converts an audio signal (analog signal) fed from the microphone 140 into a digital signal. The echo canceller 128 creates a correction signal based on the decompressed audio data obtained by the audio compression/decompression section 129. The audio data acquired by the A/D converter 127 is corrected by the echo canceller 128 using the correction signal thus created, whereby the quality of the ongoing communication is maintained.

The audio compression/decompression section 129 compresses the audio data (outgoing audio data) coming from the A/D converter 127 and corrected by the echo canceller 128 so as to create compressed audio data in accordance with a predetermined compression standard such as H.323, as in the case of the image data described above. The audio compression/decompression section 129 further decompresses the compressed audio data reconstituted by the packet zing/depacketizing section 124 and coming from the other conference terminal 101 in order to create decompressed audio data (received audio data).

What follows is a description of how the conference terminal 101 works during communication. The workings of transmission circuitry will be discussed first.

Image pickup data obtained by the camera 110 picking up the image of the object of interest is forwarded to the image compression/decompression section 123 and display processing section 126 in the terminal proper 120. The image compression/decompression section 123 compresses the pickup image data (outgoing image data) into compressed image data. The compressed image data thus created is fed to the packetizing/depacketizing section 124.

The audio signal output by the microphone 140 is supplied to the A/D converter 127 in the terminal proper 120. The A/D converter 127 converts the audio signal from analog to digital format. The audio data obtained by the A/D converter 127 is forwarded to the audio compression/decompression section 129 through the echo canceller 128. The audio compression/decompression section 129 compresses the audio data (outgoing audio data) into compressed audio data. The compressed audio data thus created is fed to the packetizing/depacketizing section 124.

The packetizing/depacketizing section 124 packetizes in a predetermined format the compressed image data supplied from the image compression/decompression section 123 as well as the compressed audio data coming from the audio compression/decompression section 129. The packet data thus obtained is sent to the other conference terminal 101 through the communication interface 125 over the network 200.

The other conference terminal 101 is thus supplied with the image data representing the image pickup signal acquired by the camera 110, whereby the image based on the received image data is displayed. The other communication terminal 101 is further supplied with the audio data corresponding to the audio signal output by the microphone 140, whereby the sound based on the audio data is output.

The workings of reception circuitry will now be described. The packet data sent from the other conference terminal 101 over the network 200 and received by the communication interface 125 is forwarded to the packetizing/depacketizing section 124. The packetizing/depacketizing section 124 extracts compressed image data and compressed audio data from the packet data coming from the communication interface 125. The compressed image data is fed to the image compression/decompression section 123 and the compressed audio data to the audio compression/decompression section 129.

The image compression/decompression section 123 decompresses the compressed image data coming from the packetizing/depacketizing section 124 in order to create decompressed image data (received image data). The image data thus created is forwarded to the display processing section 126. Where the display device 130 is set to give a full-screen display, the display processing section 126 supplies the display device 130 with the unmodified received image data as acquired by the image compression/decompression section 123. The display section 130 then provides a full-screen display of the received image data from the other conference terminal 101.

Where the display device 130 gives a two-screen display, the display processing section 126 creates new image data for displaying two kinds of image data in juxtaposed fashion on the same screen, the two kinds of image data being composed of the received image data obtained by the image compression/decompression section 123 and of the image data (outgoing image data) output by the camera 110. The new image data thus created is fed to the display device 130 which in turn displays two images side by side, one image being derived from the image data received from the other conference terminal 101, the other image representing the image data being sent to the other conference terminal 101.

Returning to FIG. 1, the management server 102 has function blocks including a user authentication processing section 171, a terminal and user information management section 172, a conference information management section 173, and a connection control section 174.

The user authentication processing section 171 processes user authentication in response to an authentication operation performed by the user utilizing a given conference terminal 101. In the authentication operation, the user sends user information such as a user ID and a user name as well as terminal information such as a terminal address from the conference terminal 101 to the management server 102. The user authentication processing section 171 proceeds with user authentication by referencing the user information registered in advance (i.e., information about the users authorized to use the conference system 100). The pre-registered user information is stored illustratively on the hard disk drive 103e (see FIG. 2).

If the user-input user information is found to exist in the pre-registered user information, then the user authentication processing section 171 authenticates the user in question. For example, if the user information about a user A is found included in the pre-registered user information and if the user A performs the authentication operation using a given conference terminal 101, then the user authentication processing section 171 authenticates the user A.

The terminal and user information management section 172 registers and manages the user information (user ID, user name, user affiliation, etc.) about the user authenticated by the user authentication processing section 171, in association with the terminal information (terminal address, etc.) about the terminal used by the authenticated user. More specifically, when the user authentication processing section 171 authenticates a user in response to the authentication operation performed by that user utilizing a given conference terminal 101, the terminal and user information management section 172 manages the user information about the authenticated user in association with the terminal information about the conference terminal 101 in question, the two kinds of information being stored on the hard disk drive 103e or in the RAM 103c (see FIG. 2). Suppose that the user A is authenticated following the authentication operation performed on the conference terminal 101 having an address "a." In such a case, the terminal and user information management section 172 manages the user information about the user A in association with the terminal information about the conference terminal 101 having the address "a." The terminal and user information management section 172 illustratively constitutes a first information management section as claimed in the claims of the present invention.

The conference information management section 173 registers and manages conference information including the user information about a plurality of users with intent to participate in a conference. For example, the conference information is made up of the user information about a plurality of users who will take part in a conferences and such information as the date and time at which the conference will take place. Illustratively, when conference information is input through the user operation section 104 (see FIG. 2), the conference information management section 173 stores the input conference information on the hard disk drive 103e for management purposes. If the conference information is about a conference to be held by the user A and a user B, then the conference information includes the user information made up of the user names of the users A and B. Illustratively, the conference information management section 173 stands for a second information management section and the conference information for communication information as claimed in the claims of the present invention.

If the conference information including the user information about the user authenticated by the user authentication processing section 171 is managed by the conference information management section 173 and if the user information about another user included in the conference information is managed by the terminal and user information management section 172, then the connection control section 174 sends the terminal information about another conference terminal 101 associated with the user information about the other user managed by the terminal and user information management section 172, to the conference terminal 101 defined by the terminal information managed by the terminal and user information management section 172 in association with the user information about the authenticated user. It should be noted that more than one other conference terminal may exist in the system.

When a given user is authenticated by the user authentication processing section 171, the connection control section 174 determines whether or not the conference information including the user information about the authenticated user is managed by the conference information management section 173. If the conference information including the user information about the authenticated user is managed by the conference information management section 173, then the connection control section 174 determines whether or not the user information about any other user included in the conference information is managed by the terminal and user information management section 172. Where the user identified by the user information about any other user is found to have been authenticated by the user authentication processing section 171, the user information about the other user is managed by the terminal and user information management section 172.

Where the user information about any other user is managed by the terminal and user information management section 172, the connection control section 174 sends the terminal information about the other conference terminal 101 associated with the user information about the other user managed by the terminal and user information management section 172, to the conference terminal 101 identified by the terminal information managed by the terminal and user information management section 172 in association with the user information about the authenticated user.

For example, suppose that the user A is authenticated by the user authentication processing section 171, that the conference information including the user information about the user A and user B is managed by the conference information management section 173, and that the user information about the user B is managed by the terminal and user information management section 172. In that case, the connection control section 174 sends the terminal information about the conference terminal 101 associated with the user information about the user B managed by the terminal and user information management section 172, to the conference terminal 101 used by the user A.

If the conference information including the user information about the user authenticated by the user authentication processing section 171 is not managed by the conference information management section 173, then the connection control section 174 provides the following control: If the conference terminal 101 identified by the terminal information managed by the terminal and user information management section 172 in association with the user information about the user authenticated by the user authentication processing section 171 is operated to select the user identified by the user information about any other user managed by the terminal and user information management section 172, then the connection control section 174 sends the terminal information about the other conference terminal 101 associated with the user information about the other user managed by the terminal and user information management section 172, to the conference terminal 101 identified by the terminal information managed by the terminal and user information management section 172 in association with the user information about the authenticated user.

Illustratively, if the conference information including the user information about the authenticated user is not managed by the conference information management section 173, then the connection control section 174 sends a list of user names corresponding to the user information about the users managed by the terminal and user information management section 172, to the conference terminal 101 used by the authenticated user. If selection information about a user name selected from the user name list is sent from the conference terminal 101 used by the authenticated user, then the connection control section 174 recognizes the selection of the user identified by the user information about the other user managed by the terminal and user information management section 172.

Suppose now that when the user A is authenticated by the user authentication processing section 171, that the conference information including the user information about the user A is not managed by the conference information management section 173, and that a user name list covering the user B and a user C is sent from the connection control section 74 to the conference terminal 101 used by the user A. In that case, if selection information about, say, the user B is sent from the conference terminal 101, then the connection control section 174 sends the terminal information about the conference terminal 101 associated with the user information about the user B managed by the terminal and user information management section 172, to the conference terminal 101 used by the user A.

The flowchart of FIG. 4 shows steps performed when a conference terminal 101 proceeds to connect with another terminal 101 in conjunction with the management server 102. In step ST1, the management server 102 registers as user authentication information the user information about the users authorized to use the conference system 100, illustratively on the basis of the operations performed by each user utilizing the user operation section 104. In step ST2, based on the operations carried out by each user on the user operation section 104, the management server 102 causes the conference information management section 173 to register as many items of conference information as needed including the user information about a plurality of users who will participate in the registered conferences. Alternatively, the management server 102 may choose not to register conference information in step ST2. After step ST2, the management server 102 goes to step ST3 and waits for registration to take place.

While the management server 102 is waiting for registration, the conference terminal 101 reaches step ST21 and allows the user to perform an operation for authentication by way of the authentication interface 131. At this point, the conference terminal 101 sends the user information such as a user ID and the terminal information about that terminal 101 such as its terminal address.

The management server 102 waiting for registration in step ST3 receives the user information and terminal information coming from the conference terminal 101 following the user's authentication operation. The management server 102 then goes to step ST4 and causes the user authentication processing section 171 to proceed with user authentication processing based on the user information from the conference terminal 101. If the user information sent from the conference terminal 101 is found to exist in the user information registered beforehand in step ST1, then the management server 102 authenticates the user in question. The management server 102 thereafter goes to step ST5.

In step ST5, the management server 102 causes the terminal and user information management section 172 to register the user information about the user authenticated in the user authentication process of step ST4 in association with the terminal information about the conference terminal used by the authenticated user. In step ST6, the management server 102 verifies the conference information (i.e., conference reservations) registered by the conference information registration section 173. In step ST7, the management server 102 causes the connection control section 174 to determine whether or not the conference information managed by the conference information management section 173 includes the user information about the user authenticated in the user authentication process of step ST4, i.e., whether or not there exists any conference reservation.

If such a conference reservation is found to exist in the conference information, then the management server 102 goes to step ST8. In step ST8, the management server 102 causes the connection control section 174 to determine whether or not the user information about any other user included in the conference information is managed by the terminal and user information management section 172, i.e., whether or not the opposite user has been registered. The user information about any other user included in the conference information may cover one or a plurality of users. The opposite user is considered to be registered if all user information about any other user included in the conference information is found managed by the terminal and user information management section 172. If the opposite user has yet to be registered, then the management server 102 returns to step ST3 and waits for registration to take place. If the opposite user is found registered, then the management server 102 goes to step ST9.

In step ST9, the management server 102 causes the connection control section 174 to acquire the terminal information associated with the opposite user (i.e., terminal information about the terminal used by the opposite user) from the information managed by the terminal and user information management section 172. In step ST10, the management server 102 causes the connection control section 174 to send address information about the conference terminal 101 of the opposite user included in the terminal information acquired in step ST9, to the conference terminal 101 used by the authenticated user.

In step ST24, the conference terminal 101 used by the authenticated user places a call with the conference terminal 101 of the opposite user through the use of the address information about the latter conference terminal 101 sent from the management server 102. In step ST25, the conference terminal 101 used by the authenticated user is connected to the conference terminal 101 of the opposite user, and these users start a conference using their respective terminals.

If no conference reservation is found to exist in step ST7, then the management server 102 goes to step ST11 and sends a list of user names corresponding to the user information about the users managed by the terminal and user information management section 172, to the conference terminal 101 used by the authenticated user.

In step ST22, given the user name list from the management server 102, the conference terminal 101 is operated to select from the list the user name (or names) of the opposite user with whom to communicate. In step ST23, the conference terminal 101 sends information representative of the selected user name or names to the management server 102.

Illustratively, upon receipt of the user name list from the management server 102, the conference terminal 101 (see FIG. 3) may display on the display device 130 a GUI (graphical user interface) screen prompting the user to select a user name or names from the received list. In this case, the display processing section 126 creates image data constituting the GUI screen and supplies the created image data to the display device 130 under control of the control section 121. Looking at the GUI screen appearing on the display device 130, the user may select the user name or names of the opposite user with whom to communicate by operation of the remote commander 160.

Upon receipt of the information representing the selected user name or names from the conference terminal 101 in step ST12, the management server 102 goes to step ST9 and causes the connection control section 174 to acquire the terminal information associated with the user in question (i.e., the user identified by the user name received in step ST12) from the information managed by the terminal and user information management section 172. In step ST10, the management server 102 causes the connection control section 174 to send the address information about the conference terminal 101 of the opposite user included in the terminal information acquired in step ST9, to the conference terminal 101 used by the authenticated user.

In step ST24, the conference terminal 101 used by the authenticated user places a call with the conference terminal 101 of the opposite user through the use of the address information which denotes the latter conference terminal 101 and which is sent from the management server 102. In step ST25, the conference terminal 101 used by the authenticated user is connected to the conference terminal 101 of the opposite user, and these users start a conference using their respective terminals.

In the flowchart of FIG. 4, the conference terminal 101 was shown to select the user name of the user with whom to communicate from the user name list sent from the management server 102, before sending the information denoting the selected user to the management server 102. If the list includes no user name of the user with whom to communicate, then the conference terminal 101 will not be operated to select any user name. In this case, the conference terminal 101 will not send the information about the selected user name, and the management server 102 does not carry out step ST12 and subsequent steps.

Figure 5C:
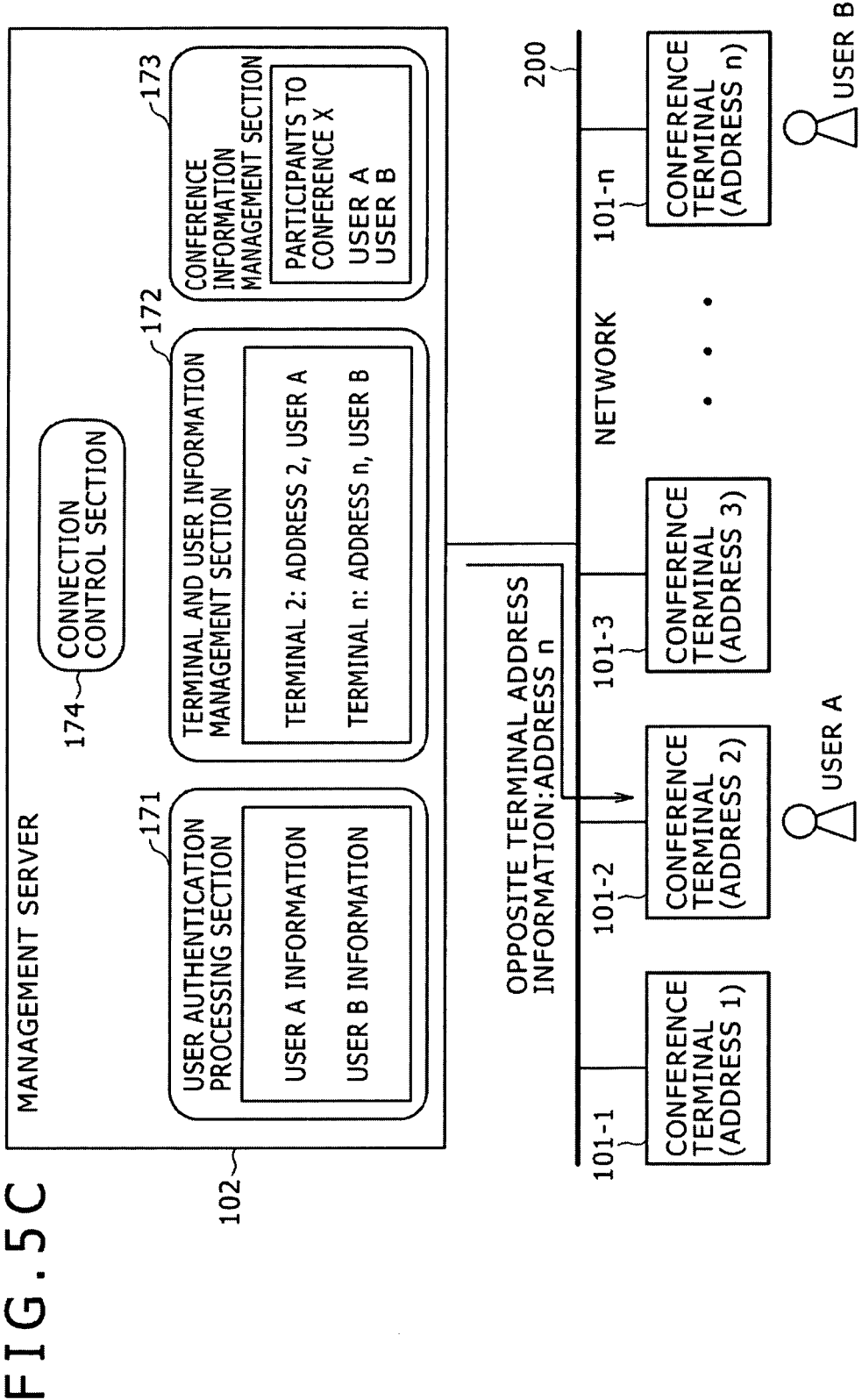
FIG. 5C is a further schematic view showing how the management server and conference terminals typically operate when the conference information is managed by the conference information management section of the management server.

FIGS. 5A through 5E are schematic views showing how the management server 102 and conference terminals typically operate when conference information is managed by the conference information management section 173 of the management server 102. It is assumed that as shown in FIG. 5A, the conference information management section 173 of the management server 102 manages conference information X about the conference to be held by the user A and user B, and that the user A performs an operation for authentication using a conference terminal 101-2 having address 2. In this case, the conference terminal 101-2 sends user information (about the user A) and terminal information (i.e., address 2) to the management server 102. The user B is assumed to carry out an operation for authentication using a conference terminal 101-*n* having address "n." In this case, the conference terminal 101-*n* sends user information (about the user B) and terminal information (i.e., address "n") to the management server 102.

In response to the authentication operations carried out by the user A and user B, the user authentication processing section 171 of the management server 102 carries out user authentication. Following the user authentication, as shown in FIG. 5B, the terminal and user information management section 172 of the management server 102 manages the user A in association with address 2 and the user B in connection with address "n."

It might happen that the user B is authenticated first, followed by authentication of the user A. In that case, as shown in FIG. 5C, the conference information X including the user information about the user A exists in the conference information management section 173 of the management server 102, and the user information about the user B acting as the opposite user is managed by the terminal and user information management section 172 of the management server 102. As a result, the connection control section 174 of the management server 102 sends the address information (address "n") which denotes the conference terminal 101-*n* used by the user B and which is managed by the terminal and user information management section 172, to the conference terminal 101-2 used by the user A.

As shown in FIG. 5D, the conference terminal 101-2 places a call with the conference terminal 101-*n* through the use of the address information (address "n") which denotes the latter conference terminal 101-*n* and which is sent from the management server 102. This causes the conference terminals 101-2 and 101-*n* to be interconnected, allowing the user A and user B to start holding a conference using their respective terminals 101-2 and 101-*n*, as shown in FIG. 5E.

Figure 6A:
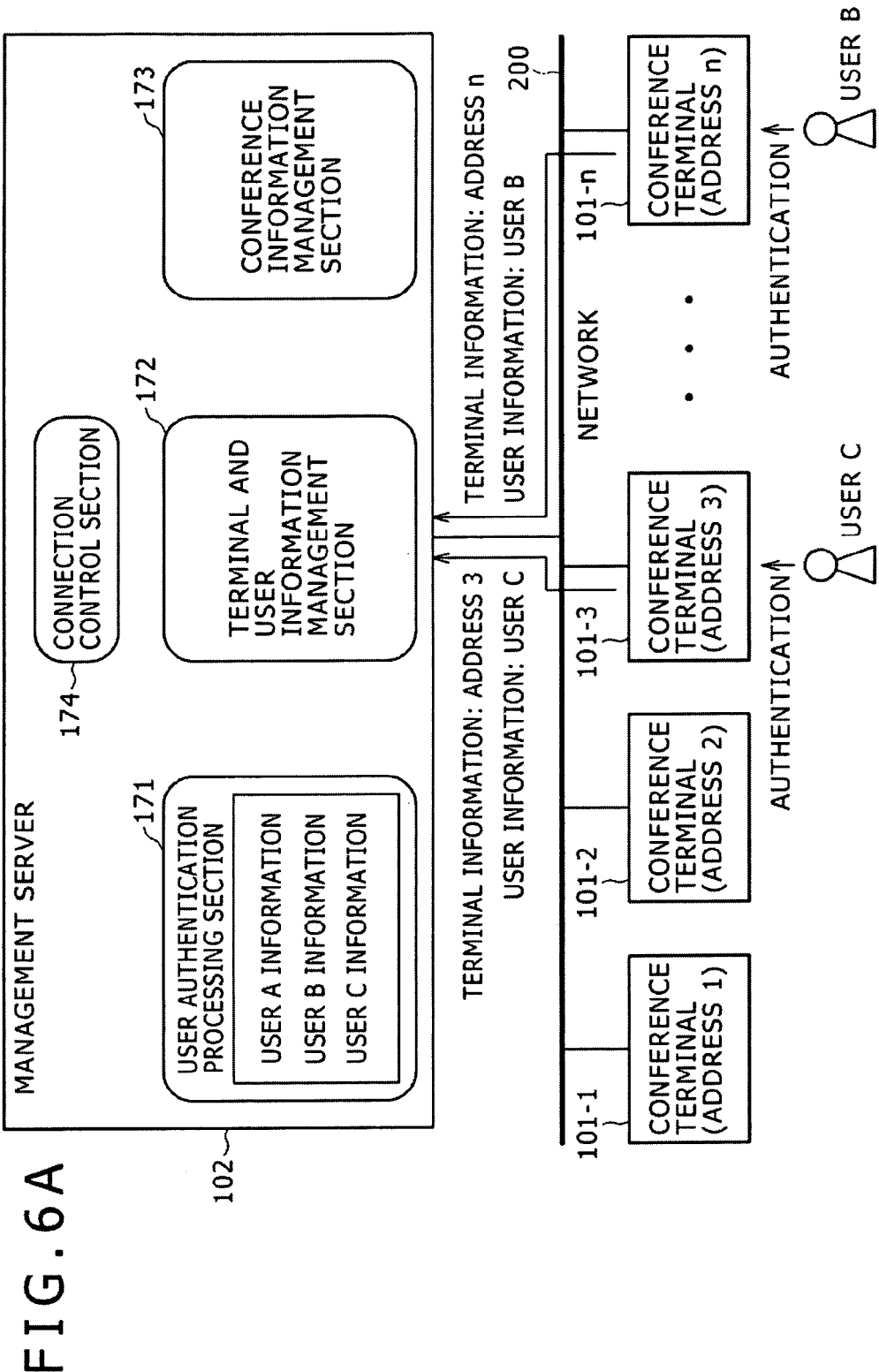
FIG. 6A is one schematic view showing how the management server and conference terminals typically operate when the conference information is not managed by the conference information management section of the management server.

FIGS. 6A through 6F are schematic views showing how the management server 102 and conference terminals typically operate when the conference information is not managed by the conference information management section 173 of the management server 102. As shown in FIG. 6A, with the conference information not managed by the conference information management section 173 of the management server 102, the user C is assumed to perform an operation for authentication using a conference terminal 101-3 having address 3. In this case, the conference terminal 101-3 sends user information (about the user C) and terminal information (address 3) to the management server 102. It is assumed here that the user C carries out an authentication operation using the conference terminal 101-*n* having address "n." At this point, the conference terminal 101-*n* sends user information (about the user B) and terminal information (address "n") to the management server 102.

In response to the authentication operations carried out by the user C and user B as described above, the user authentication processing section 171 of the management server 102 authenticates the users. Following the user authentication, as shown in FIG. 6B, the terminal and user information management section 172 of the management server 102 manages the user C in association with address 3 and the user B in connection with address "n." In this state, the user A is assumed to perform an authentication operation using the conference terminal 101-2 having address 2. At this point, the conference terminal 101-2 sends user information (about the user A) and terminal information (address 2) to the management server 102.

In response to the authentication operation carried out by the user A as described above, the user authentication processing section 171 of the management server 102 authenticates the user A. As shown in FIG. 6C, the terminal and user information management section 172 of the management server 102 manages the user A in association with address 2. It should be noted that upon authentication of the user A, the conference information including the user information about the user A does not exist in the conference information management section 173 of the management server 102. In such a case, as shown in FIG. 6C, the connection control section 174 of the management server 102 sends a list of user names including those of the user B and user C to the conference terminal 101-2 with address 2 for use by the user A, on the basis of the user information managed by the terminal and user information management section 172. If the user A selects the user name of, say, the user B, then the conference terminal 101-2 sends selection information representative of the user name of the user B to the management server 102.

Upon receipt of the selection information denoting the user name of the user B from the conference terminal 101-2, the connection control section 174 of the management server 102 sends the address information (address "n") which represents the conference terminal 101-*n* used by the user B and which is managed by the terminal and user information management section 172, to the conference terminal 101-2 used by the user A, as shown in FIG. 6D.

Figure 6E:
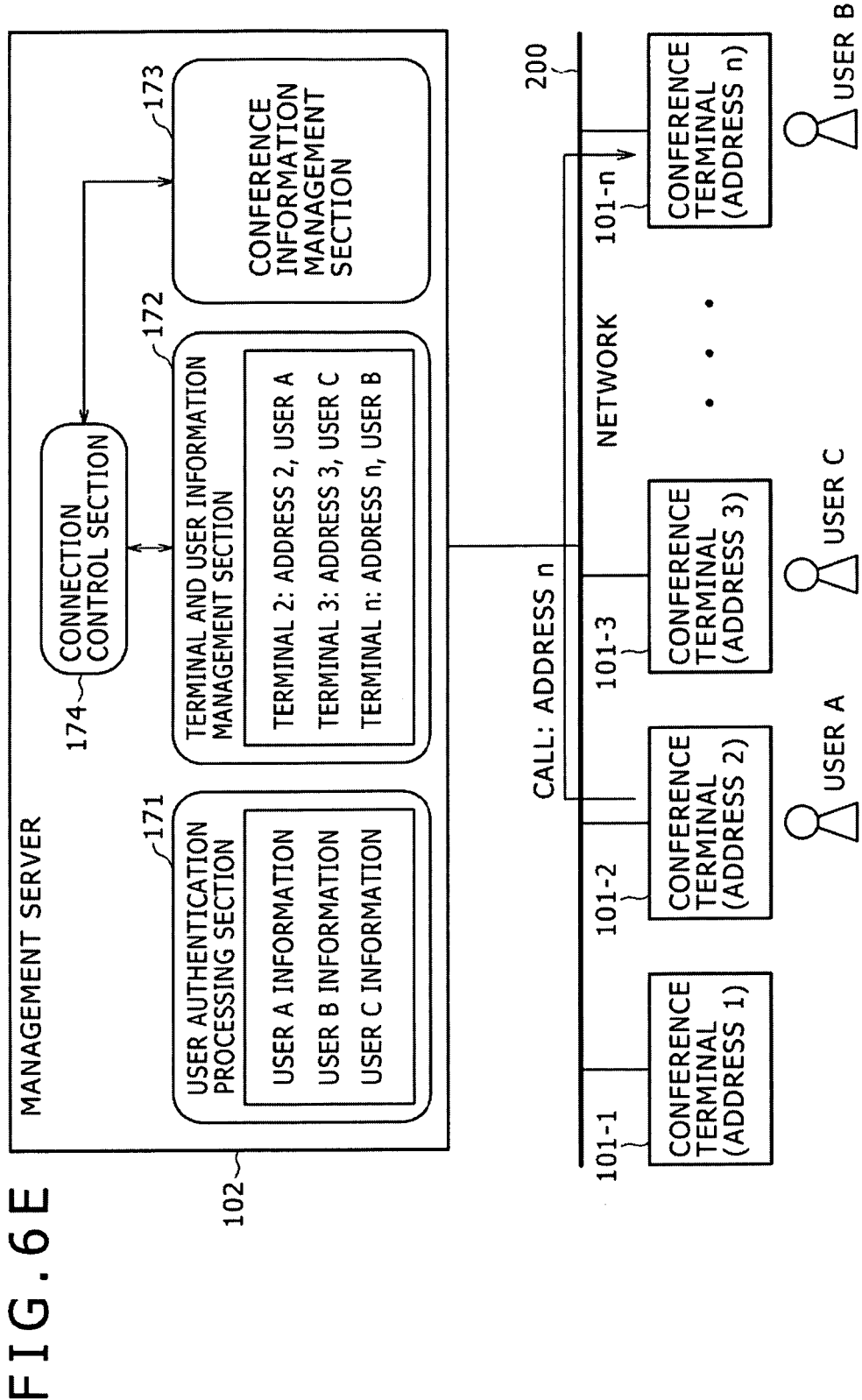
FIG. 6E is a still further schematic view showing how the management server and conference terminals typically operate when the conference information is not managed by the conference information management section of the management server.

As shown in FIG. 6E, the conference terminal 101-2 places a call with the conference terminal 101-*n* through the use of the address information (address "n") which designates the latter conference terminal 101-*n* and which is sent from the management server 102. This causes the conference terminals 101-2 and 101-*n* to be interconnected, allowing the user A and user B to start holding a conference using their respective terminals 101-2 and 101-*n* as shown in FIG. 6F.

In the conference system 100 shown in FIG. 1, as discussed above, each of the users scheduled for a conference using the conference information managed by the conference information management section 173 of the management server 102 need only perform an authentication operation on any one of the conference terminals interconnected via the network 200. The conference terminal operated by one user for his or her authentication may then be connected with another terminal operated by another user for authentication under control of the connection control section 174 of the management server 102. Each user need not become aware of such terminal information as a terminal address about the conference terminal 101 used by the opposite user; any one of the networked conference terminals may be used by one user to communicate with the opposite user using another terminal on the network.

Where the conference system 100 of FIG. 1 is in place, if the conference information about the authenticated user is not managed by the conference information management section 173 of the management server 102, then the authenticated user may simply select any of the other users who have been authenticated and registered. This allows the conference terminals used by the respective users for their authentication to be interconnected under control of the connection control section 174 of the management server 102. Each user need not become aware of such terminal information as a terminal address about the conference terminal 101 used by the opposite user in communicating with each other for a conference.

Where the conference system 100 of FIG. 1 is in use, if the conference information about the authenticated user is not managed by the conference information management section 173 of the management server 102, then the connection control section 174 of the management server 102 may send a list of user names of the other users who have been authenticated and registered, to the conference terminal 101 used by the authenticated user. From the user name list thus received, the authenticated user may easily select any of the users with whom to hold a conference.

In connection with the preferred embodiment of the present invention discussed above, the management server 102 was shown to include the conference information management section 173, and the conference information management section 173 was described as capable of managing the conference information registered in advance. However, this is not limitative of the present invention. A second embodiment may be devised alternatively in such a manner that the management server 102 does not include the conference information management section 173.

Figure 7:
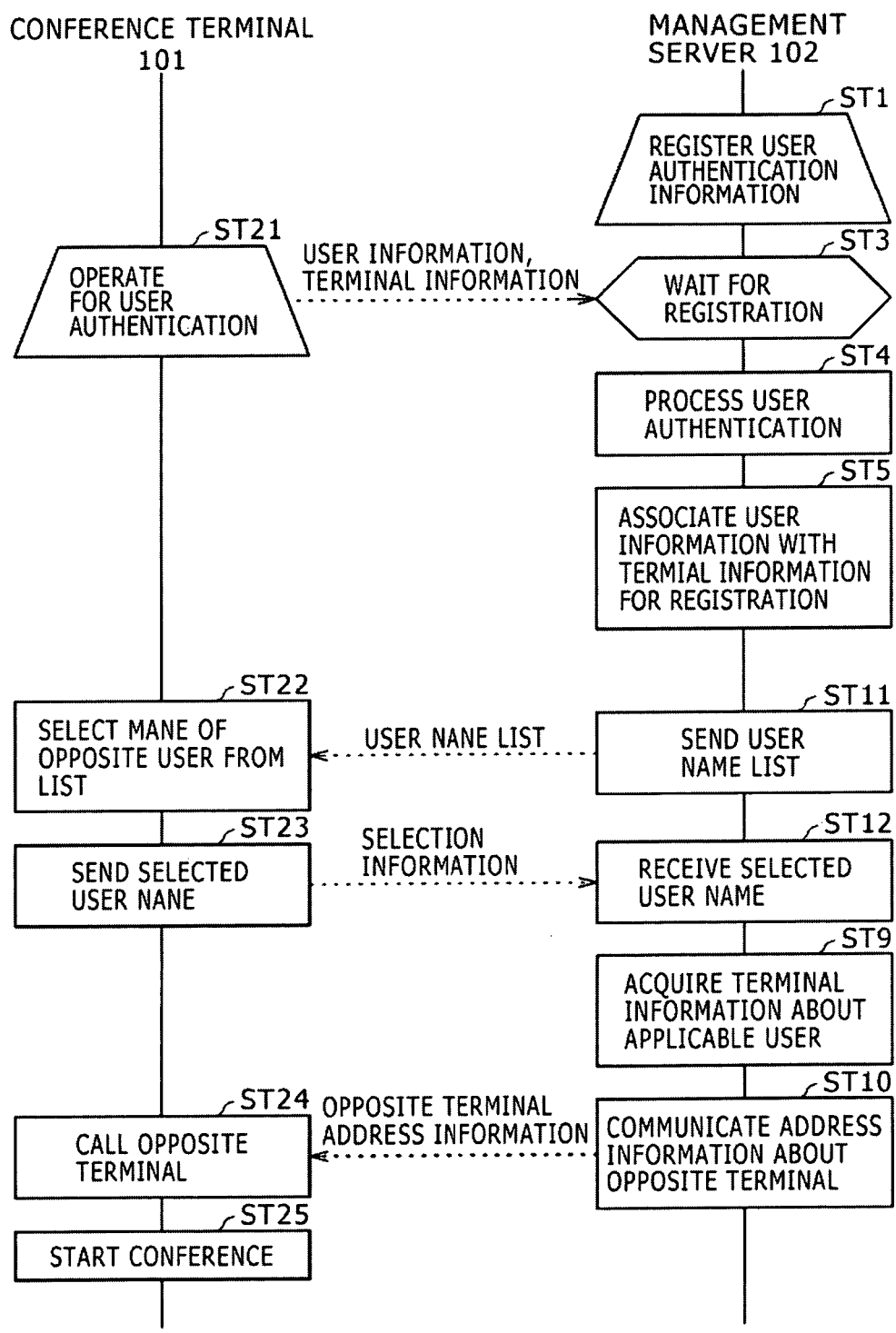
FIG. 7 is another flowchart of steps performed when a conference terminal proceeds to connect with another terminal under control of the management server.

The flowchart of FIG. 7 shows steps performed when a conference terminal proceeds to connect with another terminal in conjunction with the management server 102 that does not have the conference information management section 173. Of the reference numerals in the flowchart of FIG. 7, those already used in the flowchart of FIG. 4 designate like or corresponding steps, and their detailed descriptions will not be repeated where redundant.

During the processing of FIG. 7, the management server 102 does not register conference information (see step ST2 in FIG. 4). The management server 102 goes to step ST11 immediately after registering in step ST5 the user information about the authenticated user in association with the terminal information about the terminal used by that user. In step ST11, the management server 102 sends a list of user names to the conference terminal 101 used by the authenticated user.

In connection with the first embodiment above of the invention, it was shown that if the conference information including the user information about the user authenticated by the user authentication processing section 171 is not managed by the conference information management section 173, and if the conference terminal 101 used by the authenticated user is operated to select another user whose user information is managed by the terminal and user information management section 172, then the connection control section 174 of the management server 102 sends the terminal information about another conference terminal 101 corresponding to the user information which denotes the other user and which is managed by the terminal and user information management section 172, to the conference terminal 101 used by the authenticated user.

Alternatively, if the conference information including the user information about the user authenticated by the user authentication processing section 171 is not managed by the conference information management section 173, if the opposite user is selected by the conference terminal 101 used by the authenticated user, and if the user information about the other user representing the opposite user is managed by the terminal and user information management section 172, then the connection control section 174 of the management server 102 may send the terminal information which denotes the other conference terminal 101 corresponding to the other user and which is managed by the terminal and user information management sect on 172, to the conference terminal 101 used by the authenticated user in a third embodiment of the present invention.

In the third embodiment above of the present invention, the authenticated user need only select the opposite user. Under control of the management server 102 connected to the network 200, the conference terminal used by one user for his or her authentication may then be connected with another terminal used by another user for authentication. Each user need not become aware of such terminal information as a terminal address about the conference terminal used by the opposite user; any one of the networked conference terminals 101 may be used by one user to communicate with the opposite user using another terminal on the network.

Figure 8:
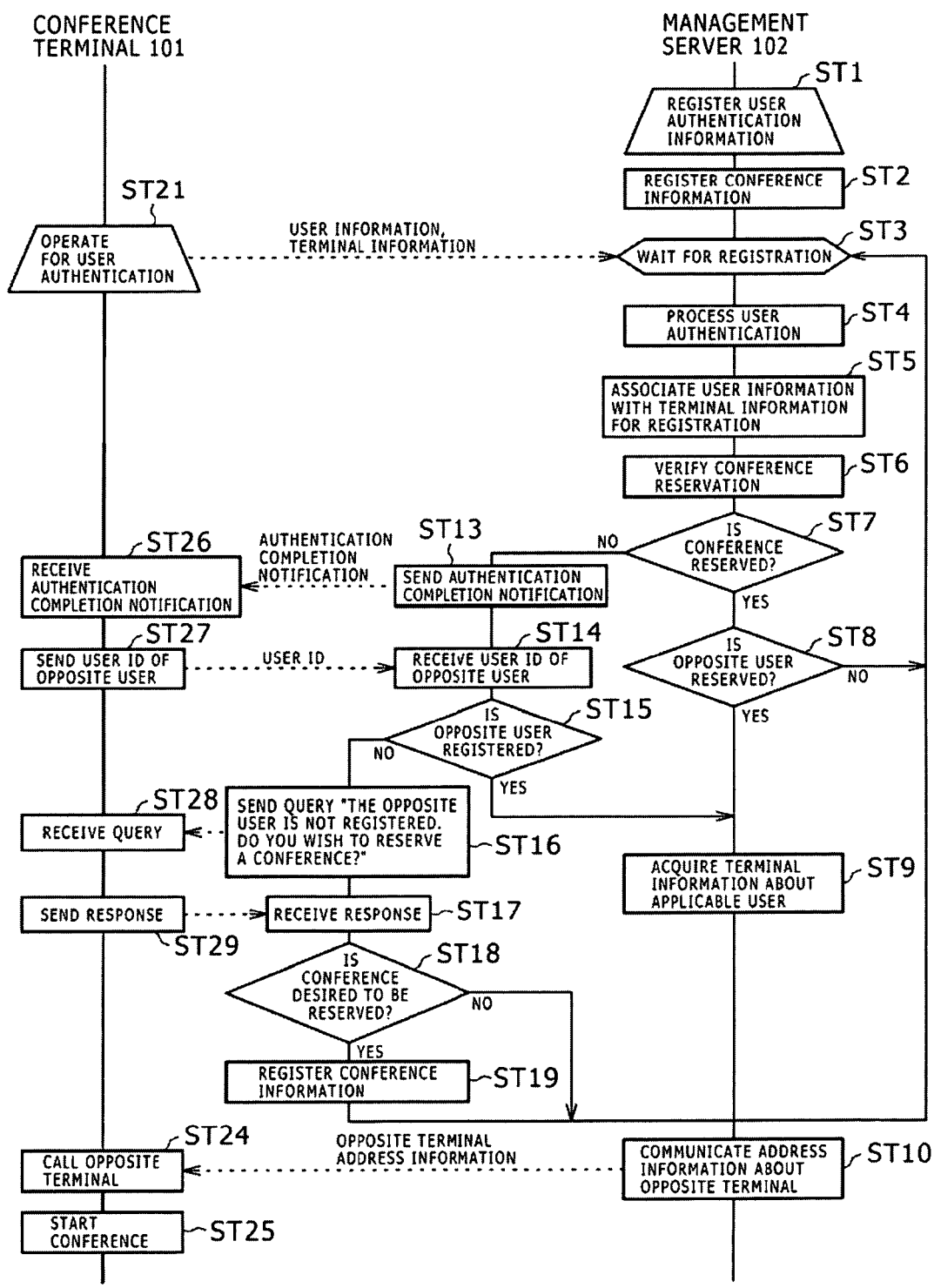
FIG. 8 is a further flowchart of steps performed when a conference terminal proceeds to connect with another terminal under control of the management server.

The flowchart of FIG. 8 shows steps performed when a conference terminal 101 proceeds to connect with another terminal in conjunction with the management server 102 in the third embodiment above. Of the reference numerals in the flowchart of FIG. 8, those already used in the flowchart of FIG. 4 designate like or corresponding steps, and their detailed descriptions will not be repeated where redundant.

If no conference reservation is found to be made in step ST7, the management server 102 goes to step ST13. In step ST13, the management server 102 sends an authentication completion notification to the conference terminal 101 used by the authenticated user.

In step ST26, the conference terminal 101 receives the authentication completion notification from the management server 102. In step ST27, the conference terminal 101 sends to the management server 102 the user information (e.g., user ID) about the opposite user with whom to communicate for a conference.

In step ST14, the management server 102 receives the user ID of the opposite user from the conference terminal 101. In step ST15, the management server 102 causes the connection control section 174 to determine whether or not the user information containing the user ID is managed by the terminal and user information management section 172, i.e., whether or not the opposite user has already been registered. If the opposite user is found to have been registered, then the management server 102 goes to step ST9 and causes the connection control section 174 to acquire the terminal information associated with the opposite user (i.e., information about the terminal used by that user) from the information managed by the terminal and user information management section 172.

In step ST10, the management server 102 causes the connection control section 174 to send the address information which denotes the conference terminal 101 of the opposite user and which is included in the terminal information acquired in step ST9, to the conference terminal 101 used by the authenticated user. In step ST24, the conference terminal 101 used by the authenticated user places a call with the conference terminal 101 of the opposite user through the use of the address information about the latter conference terminal 101 sent from the management server 102. In step ST25, the conference terminal 101 used by the authenticated user is connected to the conference terminal 101 of the opposite user, and these users start a conference using their respective terminals.

If the opposite user is not found to be registered in step ST15, then the management server 102 causes the connection control section 174 to send a query about whether or not to reserve a conference with the opposite user who has yet to be registered, to the conference terminal 101 used by the authenticated user.

In step ST28, the conference terminal 101 receives the query from the management server 102. In step ST29, the conference terminal 101 sends a response to the management server 102. If the response involves declaring the willingness to make a conference reservation, then the user information (e.g., user ID or user name) about the opposite user with whom to hold a conference is included in the response.

In step ST17, the management server 102 receives the response from the conference terminal 101. In step ST18, the management server 102 causes the connection control section 174 to determine whether or not the conference reservation is to be made. If the response from the conference terminal 101 is found declaring the willingness to reserve the conference, then the connection control section 174 determines that the conference reservation is to he made, and step ST19 is reached. In step ST19, the management server 102 causes the connection control section 174 to register the conference information including the user information about the authenticated user as well as the user information about the opposite user. Control is then returned from step ST19 to step ST3 in which the management server 102 again waits for registration. If it is determined in step ST18 that the conference reservation will not be made, then the management server 102 immediately returns to step ST3 and waits for registration.

If the conference reservation is made and if the opposite user is authenticated and registered, then the connection control section 174 of the management server 102 can control the terminal-to-terminal connection using the registered conference information (see steps ST7 through ST10).

FIGS. 9A through 9E are schematic views showing how the management server 102 and conference terminals 101 typically operate when conference information is not managed by the conference information management section 173 of the management server 102 and when a conference terminal 101 sends the user ID of the registered opposite user to the management server 102.

As shown in FIG. 9A, it is assumed that conference information is not managed by the conference information management section 173 of the management server 102 and that the user C performs an authentication operation using the conference terminal 101-3 having address 3. In this case, the conference terminal 101-3 sends user information (about the user C) and terminal information (i.e., address 3) to the management server 102. In this state, the user B is assumed to carry out an authentication operation using the conference terminal 101-n having address "n." At this point, the conference terminal 101-n sends user information (about the user B) and terminal information (address "n") to the management server 102.

In response to the authentication operations carried out by the user C and user B as described above, the user authentication processing section 171 of the management server 102 authenticates the users. Following the user authentication, as shown in FIG. 9B, the terminal and user information management section 172 of the management server 102 manages the user C in association with address 3 and the user B in connection with address "n." In this state, the user A is assumed to perform an authentication operation using the conference terminal 101-2 having address 2. At this point, the conference terminal 101-2 sends user information (about the user A) and terminal information (address 2) to the management server 102.

In response to the authentication operation carried out by the user A as described above, the user authentication processing section 171 of the management server 102 authenticates the user A. As shown in FIG. 9C, the terminal and user information management section 172 of the management server 102 manages the user A in association with address 2. It should be noted that upon authentication of the user A, the conference information including the user information about the user A does not exist in the conference information management section 173 of the management server 102. In such a case, as shown in FIG. 9C, the connection control section 174 of the management server 102 sends an authentication completion notification to the conference terminal 101-2 with address 2 for use by the user A. From the conference terminal 101-2, the user A sends the user ID of the user B as the user ID of the opposite user to the management server 102.

By the time the user ID of the user B is received from the conference terminal 101-2, the user B has already been registered by the terminal and user information management section 172. In this case, as shown in FIG. 9D, the connection control section 174 of the management server 102 sends the address information (address "n") which denotes the conference terminal 101-n used by the user B and which is managed by the terminal and user information management section 172, to the conference terminal 101-2 used by the user A.

As shown in FIG. 9E, the conference terminal 101-2 places a call with the conference terminal 101-n through the use of the address information (address "n") which designates the latter conference terminal 101-n and which is sent from the management server 102. This causes the conference terminals 101-2 and 101-n to be interconnected, allowing the user A and user B to start holding a conference using their respective terminals 101-2 and 101-n as shown in FIG. 9F.

In the above-described embodiments of the present invention, the conference system 100 was shown constituted by a plurality of conference terminals 101 and the management server 102 being interconnected via the network 200. However, this is not limitative of the present invention. Alternatively, the invention can be applied to other communication systems designed for communications other than conferences between their users.

According to the present invention, as described above, each user need not become aware of such terminal information as the terminal address about the communication terminal used by the opposite user. Any one of the networked communication terminals may be used by one user to communicate with the opposite user who uses another terminal on the network. The invention can be applied to varieties of communication systems including conference systems.

It should be understood by those skilled in the art that various modifications, combinations, sub-combinations and alterations may occur depending on design requirements and other factor in so far as they are within the scope of the appended claims or the equivalents thereof.

What is claimed is:

1. A communication system comprising:
    a plurality of communication terminals; and
    a management apparatus interconnected via a network,
    said management apparatus including
        a user authentication processing section configured to process user authentication in response to an authentication operation performed by a user using any one of said communication terminals,
        a first information management section configured to manage user information about said user authenticated by said user authentication processing section in association with terminal information about the communication terminal used by said user,
        a second information management section configured to manage communication information including the user information about a plurality of users with intent to communicate with one another, and
        a connection control section configured to be used if said second information management section manages the communication information including the user information about said user authenticated by said user authentication processing section and if said first information management section manages the user information about another user as part of said communication information, said connection control section then sending the terminal information about another communication terminal corresponding to the user information about the other user managed by said first information management section, to the communication terminal identified by the terminal information managed by said first information management section in association with the user information about the authenticated user, wherein said connection control section does not send a user name list to the communication terminal identified by the terminal information managed by said first information management section in association with the user information about the authenticated user, and wherein said connection control section checks whether said first information management section manages information about the other user before sending the terminal information about the another communication terminal corresponding to the user information about the other user.

2. A communication system management apparatus for use with a communication system connected to a plurality of communication terminals via a network, said communication system management apparatus comprising:

a user authentication processing section configured to process user authentication in response to an authentication operation performed by a user using any one of said communication terminals;

a first information management section configured to manage user information about said user authenticated by said user authentication processing section in association with terminal information about the communication terminal used by said user;

a second information management section configured to manage communication information including the user information about a plurality of users with intent to communicate with one another; and a connection control section configured to be used if said second information management section manages the communication information including the user information about said user authenticated by said user authentication processing section and if said first information management section manages the user information about another user as part of said communication information, said connection control section then sending the terminal information about another communication terminal corresponding to the user information about the other user managed by said first information management section, to the communication terminal identified by the terminal information managed by said first information management section in association with the user information about the authenticated user, wherein said connection control section does not send a user name list to the communication terminal identified by the terminal information managed by said first information management section in association with the user information about the authenticated user, and wherein said connection control section checks whether said first information management section manages the user information about the other user before sending the terminal information about the another communication terminal corresponding to the user information about the other user.

3. The communication system management apparatus according to claim 2, wherein, if said second information management section does not manage the communication information including the user information about said user authenticated by said user authentication processing section and if the communication terminal used by the authenticated user is operated to select the other user identified by the user information managed by said first information management section, then said connection control section sends the terminal information about the other communication terminal corresponding to the user information about the other user managed by said first information management section, to the communication terminal used by said authenticated user.

4. The communication system management apparatus according to claim 2, wherein, if said second information management section does not manage the communication information including the user information about said user authenticated by said user authentication processing section, if the communication terminal used by the authenticated user is operated to select an opposite user, and if said first information management section manages the user information about the other user corresponding to said opposite user, then said connection control section sends the terminal information about the other communication terminal corresponding to the user information about the other user managed by said first information management section, to the communication terminal used by said authenticated user.

5. The communication system management apparatus according to claim 4, wherein said connection control section sends an authentication completion notification to the communication terminal used by said authenticated user; and if the user information about said opposite user is sent from the communication terminal used by said authenticated user, then said connection control section recognizes the selection of said opposite user.

6. A terminal connection control method for use with a management apparatus connected to a plurality of communication terminals via a network, said terminal connection control method comprising the steps of:

processing user authentication in response to an authentication operation performed by a user using any one of said communication terminals;

firstly registering user information about said user authenticated in said user authentication processing step in association with terminal information about the communication terminal used by said user;

secondly registering communication information including the user information about a plurality of users with intent to communicate with one another; and if said second registering step has registered the communication information including the user information about said user authenticated in said user authentication processing step and if said first registering step has registered the user information about another user as part of said communication information, then sending the terminal information about another communication terminal corresponding to the user information about the other user registered in said first registering step, to the communication terminal identified by the terminal information registered in said first registering step in association with the user information about the authenticated user, wherein a user name list is not sent to the communication terminal identified by the terminal information registered in said first registering step in association with the user information about said authenticated user, and wherein it is checked whether the user information about the other user has been registered before sending the terminal information about the another communication terminal corresponding to the user information about the other user.

7. A program stored on a non-transitory storage medium for causing a computer to function as a management apparatus connected to a plurality of communication terminals via a network, said management apparatus comprising:

a user authentication processing section configured to process user authentication in response to an authentication operation performed by a user using any one of said communication terminals;

a first information management section configured to manage user information about said user authenticated by said user authentication processing section in association with terminal information about the communication terminal used by said user;

a second information management section configured to manage communication information including the user information about a plurality of users with intent to communicate with one another; and a connection control section configured to be used if said second information management section manages the communication information including the user information about said user authenticated by said user authentication processing section and if said first information management section manages the user information about another user as part of said communication information, said connection control section then sending the terminal information about another communication terminal corresponding to the user information about the other user managed by said first information management section, to the communication terminal identified by the terminal information managed by said first information management section in association with the user information about the authenticated user, wherein said connection control section does not send a user name list to the communication terminal identified by the terminal information managed by said first information management section in association with the user information about the authenticated user, and wherein said connection control section checks whether said first information management section manages the user information about the other user before sending the terminal information about the another communication terminal corresponding to the user information about the other user.

8. A communication system comprising:

a plurality of communication terminals; and a management apparatus interconnected via a network, said management apparatus including a user authentication processing section configured to process user authentication in response to an authentication operation performed by a user using any one of said communication terminals, an information management section configured to manage user information about the user authenticated by said user authentication processing section in association with terminal information about the communication terminal used by said user, and a connection control section configured to be used if an opposite user is selected by the communication terminal identified by the terminal information managed by said information management section in association with the user information about the user authenticated by said user authentication processing section and if said information management section manages the user information about the other user corresponding to said opposite user, said connection control section then sending the terminal information about another communication terminal corresponding to the user information about the other user managed by said information management section, to the communication terminal used by said authenticated user, wherein said connection control section does not send a user name list to the communication terminal used by said authenticated user, and wherein said connection control section checks whether said information management section manages the user information about the other user before sending the terminal information about the another communication terminal corresponding to the user information about the other user.

9. A communication system management apparatus connected to a plurality of communication terminals via a network, said communication system management apparatus comprising:

a user authentication processing section configured to process user authentication in response to an authentication operation performed by a user using any one of said communication terminals;

an information management section configured to manage user information about the user authenticated by said user authentication processing section in association with terminal information about the communication terminal used by said user; and a connection control section configured to be used if an opposite user is selected by the communication terminal identified by the terminal information managed by said information management section in association with the user information about the user authenticated by said user authentication processing section and if said information management section manages the user information about the other user corresponding to said opposite user, said connection control section then sending the terminal information about another communication terminal corresponding to the user information about the other user managed by said information management section, to the communication terminal used by said authenticated user, wherein said connection control section does not send user name list to the communication terminal used by said authenticated user, and wherein said connection control section checks whether said information management section manages the user information about the other user before sending the terminal information about the another communication terminal corresponding to the user information about the other user.

10. The communication system management apparatus according to claim 9, wherein said connection control section sends an authentication completion notification to the communication terminal used by said authenticated user; and if the user information about said opposite user is sent from the communication terminal used by said authenticated user, then said connection control section recognizes the selection of said opposite user.

11. The communication system management apparatus according to claim 9, wherein, if the user information about the other user is not managed by said information management section, then said connection control section sends to the communication terminal used by said authenticated user a query about whether or not to reserve communication with the other user identified by the user information about said other user; and if the communication terminal used by said authenticated user returns a response saying that the communication will be reserved in reply to said inquiry from the communication terminal used by said authenticated user, then said connection control section registers the communication information including the user information about said authenticated user and the user information about said other user.

12. A terminal connection control method for use with a management apparatus connected to a plurality of communication terminals via a network, said terminal connection control method comprising the steps of:

processing user authentication in response to an authentication operation performed by a user using any one of said communication terminals;

registering user information about the user authenticated in said user authentication processing step in association with terminal information about the communication terminal used by said user; and if an opposite user is selected by the communication terminal identified by the terminal information registered in said information registering step in association with the user information about the user authenticated in said user authentication processing step and if said information registering step has registered the user information about the other user corresponding to said opposite user, then sending the terminal information about another communication terminal corresponding to the user information about the other user registered in said information registering step, to the communication terminal used by said authenticated user, wherein a user name list is not sent to the communication terminal used by said authenticated user, and wherein it is checked whether the user information about the other user has been registered before sending the terminal information about the another communication terminal corresponding to the user information about the other user.

13. A program stored on a non-transitory storage medium for causing a computer to function as a management apparatus connected to a plurality of communication terminals via a network, said management apparatus comprising:

a user authentication processing section configured to process user authentication in response to an authentication operation performed by a user using any one of said communication terminals;

an information management section configured to manage user information about the user authenticated by said user authentication processing section in association with terminal information about the communication terminal used by said user; and a connection control section configured to be used if an opposite user is selected by the communication terminal identified by the terminal information managed by said information management section in association with the user information about the user authenticated by said user authentication processing section and if said information management section manages the user information about the other user corresponding to said opposite user, said connection control section then sending the terminal information about another communication terminal corresponding to the user information about the other user managed by said information management section, to the communication terminal used by said authenticated user, wherein said connection control section does not send a user name list to the communication terminal used by said authenticated user, and wherein said connection control section checks whether said information management section manages the user information about the other before sending the terminal information about the another communication terminal corresponding to the user information about the other user.

14. A communication system management apparatus for use with a communication system connected to a plurality of communication terminals via a network, comprising:

user authentication processing means for processing user authentication in response to an authentication operation performed by a user using any one of said communication terminals;

first information management means for managing user information about said user authenticated by said user authentication processing means in association with terminal information about the communication terminal used by said user;

second information management means for managing communication information including the user information about a plurality of users with intent to communicate with one another; and connection control means for being used if said second information management means manages the communication information including the user information about said user authenticated by said user authentication processing means and if said first information management means manages the user information about another user as part of said communication information, said connection control means then sending the terminal information about another communication terminal corresponding to the user information about the other user managed by said first information management means, to the communication terminal identified by the terminal information managed by said first information management means in association with the user information about the authenticated user, wherein said connection control means does not send a user name list to the communication terminal identified by the terminal information managed by said first information management means in association with the user information about the authenticated user, and wherein said connection control means checks whether said information management means manages the user information about the other user before sending the terminal information about the another communication terminal corresponding to the user information about the other user.

15. A communication system management apparatus connected to a plurality of communication terminals via a network, said communication system management apparatus comprising:

user authentication processing means for processing user authentication in response to an authentication operation performed by a user using any one of said communication terminals;

information management means for managing user information about the user authenticated by said user authentication processing means in association with terminal information about the communication terminal used by said user; and connection control means for being used if an opposite user is selected by the communication terminal identified by the terminal information managed by said information management means in association with the user information about the user authenticated by said user authentication processing means and if said information management means manages the user information about the other user corresponding to said opposite user, said connection control means then sending the terminal information about another communication terminal corresponding to the user information about the other user managed by said information management means, to the communication terminal used by said authenticated user, wherein said connection control means does not send a user name list to the communication terminal used by said authenticated user, and wherein said connection control means checks whether said information management means manages the user information about the other user before sending the terminal information about the another communication terminal corresponding to the user information about the other user.

* * * * *